(12) United States Patent
Frey

(10) Patent No.: US 9,946,424 B2
(45) Date of Patent: Apr. 17, 2018

(54) FORCE-SENSING CAPACITOR ELEMENTS, DEFORMABLE MEMBRANES AND ELECTRONIC DEVICES FABRICATED THEREFROM

(71) Applicant: 3M INNOVATIVE PROPERTIES COMPANY, St. Paul, MN (US)

(72) Inventor: Matthew H. Frey, Cottage Grove, MN (US)

(73) Assignee: 3M INNOVATIVE PROPERTIES COMPANY, Saint Paul, MN (US)

( * ) Notice: Subject to any disclaimer, the term of this patent is extended or adjusted under 35 U.S.C. 154(b) by 0 days.

(21) Appl. No.: 15/518,301

(22) PCT Filed: Oct. 14, 2015

(86) PCT No.: PCT/US2015/055503
§ 371 (c)(1),
(2) Date: Apr. 11, 2017

(87) PCT Pub. No.: WO2016/073153
PCT Pub. Date: May 12, 2016

(65) Prior Publication Data
US 2017/0308204 A1    Oct. 26, 2017

Related U.S. Application Data

(60) Provisional application No. 62/075,295, filed on Nov. 5, 2014.

(51) Int. Cl.
*G06F 3/045* (2006.01)
*G06F 3/044* (2006.01)
(Continued)

(52) U.S. Cl.
CPC ............ *G06F 3/044* (2013.01); *G06F 3/0414* (2013.01); *G01L 1/142* (2013.01)

(58) Field of Classification Search
CPC .......... G06F 3/044; G06F 3/0414; G01L 1/142
See application file for complete search history.

(56) References Cited

U.S. PATENT DOCUMENTS 5,693,886 A    12/1997  Seimiya et al.
7,343,813 B1    3/2008  Harrington
(Continued)

OTHER PUBLICATIONS

International Search Report for PCT International Application No. PCT/US2015/055503, dated Feb. 24, 2016, 5 pages.

*Primary Examiner* — Peter D McLoone

(57) ABSTRACT

The present disclosure relates to deformable membranes and force-sensing capacitor elements useful, for example, in electronic devices that include, for example touch screen displays or other touch sensors. The deformable membranes, generally, include a first, second and third layers, with a first arrangement of a plurality of first structures interposed between the first and third layers and a second arrangement of a plurality of second structures interposed between the second and third layers. At least a portion, but not all, of the plurality of first structures have first and/or second surfaces that each overlap through the thickness of the deformable membrane with one or more of the first surfaces or with one or more of the second surfaces of the plurality of second structures. Electrodes or one or more electrode pairs are incorporated into the deformable membrane layer(s) to form force-sensing capacitors. The present disclosure also relates to methods of making deformable membranes and force-sensing capacitor elements, and electronic devices, e.g. touch screen displays that include the deformable membranes and force-sensing capacitor elements.

17 Claims, 12 Drawing Sheets

(51) Int. Cl.
*G06F 3/041* (2006.01)
*G01L 1/14* (2006.01)

(56) References Cited

U.S. PATENT DOCUMENTS

| | | | |
|---|---|---|---|
| 7,538,760 B2 * | 5/2009 | Hotelling | G06F 3/0414 178/18.06 |
| 8,599,165 B2 | 12/2013 | Westhues et al. | |
| 9,075,095 B2 * | 7/2015 | Kallassi | G01R 27/2605 |
| 9,201,468 B2 * | 12/2015 | Schediwy | G06F 1/1692 |
| 9,454,268 B2 * | 9/2016 | Badaye | G06F 3/0416 |
| 2007/0229464 A1 * | 10/2007 | Hotelling | G06F 3/0414 345/173 |
| 2008/0142281 A1 | 6/2008 | Geaghan | |
| 2009/0135622 A1 * | 5/2009 | Johnson | G09F 13/22 362/602 |
| 2009/0167325 A1 | 7/2009 | Geaghan | |
| 2009/0225050 A1 * | 9/2009 | Toyomaki | G02F 1/13338 345/173 |
| 2010/0073323 A1 | 3/2010 | Geaghan | |
| 2011/0115717 A1 | 5/2011 | Hable et al. | |
| 2012/0086666 A1 * | 4/2012 | Badaye | G06F 3/044 345/174 |
| 2012/0222496 A1 | 9/2012 | Mamigonians | |
| 2012/0222498 A1 | 9/2012 | Mamigonians | |
| 2012/0256876 A1 * | 10/2012 | Yeh | G06F 3/0414 345/174 |
| 2013/0033450 A1 | 2/2013 | Coulson et al. | |
| 2013/0040073 A1 | 2/2013 | Pett et al. | |
| 2013/0082763 A1 | 4/2013 | Inada et al. | |
| 2013/0082970 A1 | 4/2013 | Frey et al. | |
| 2014/0076066 A1 | 3/2014 | Harrington et al. | |
| 2014/0085213 A1 | 3/2014 | Huppi et al. | |
| 2014/0092064 A1 | 4/2014 | Bernstein et al. | |
| 2014/0150572 A1 | 6/2014 | Lim et al. | |
| 2014/0238152 A1 * | 8/2014 | Kallassi | G01R 27/2605 73/862.626 |
| 2015/0002447 A1 * | 1/2015 | Schediwy | G06F 1/1692 345/174 |
| 2016/0077648 A1 * | 3/2016 | Hsieh | G06F 3/0414 345/174 |
| 2017/0177114 A1 * | 6/2017 | Frey | G06F 3/044 |

* cited by examiner

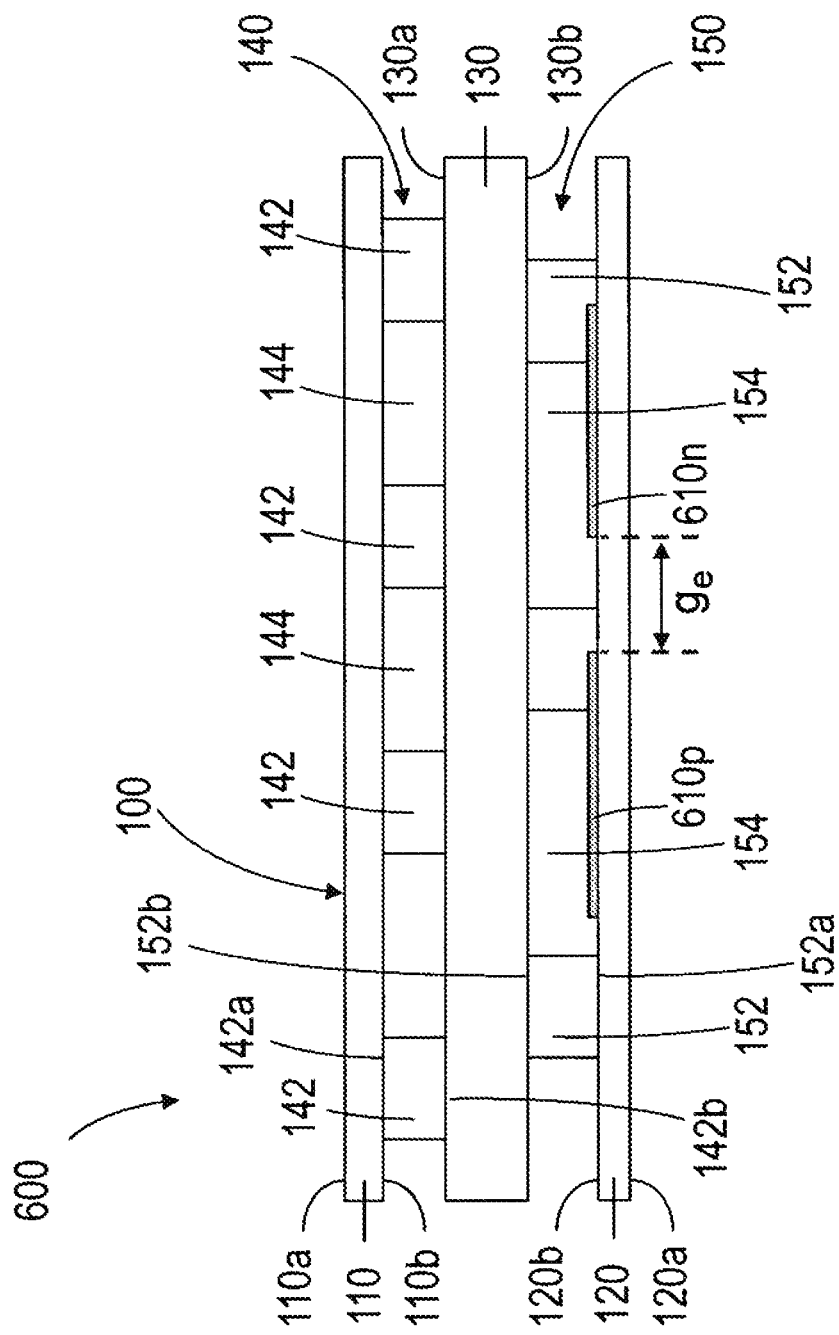

FORCE-SENSING CAPACITOR ELEMENTS, DEFORMABLE MEMBRANES AND ELECTRONIC DEVICES FABRICATED THEREFROM

CROSS REFERENCE TO RELATED APPLICATIONS

This application is a national stage filing under 35 U.S.C. 371 of PCT/US2015/055503, filed Oct. 14, 2015, which claims the benefit of U.S. Provisional Application No. 62/075,295, filed Nov. 5, 2014, the disclosures of which are incorporated by reference in their entireties herein.

FIELD

The present disclosure relates to deformable membranes and force-sensing capacitor elements, methods of fabrication thereof and electronic devices therefrom.

BACKGROUND

Force-sensing capacitors have been contemplated or applied for many years in touch displays, keyboards, touch pads, and other electronic devices. The recent renaissance of the touch user interface (paradigm shift from resistive to projected capacitive) has catalyzed a renewed interest at electronic device makers to consider force-sensing. The main challenges associated with the integration of force-sensing with the display of an electronic device, for example, include linearity of response, speed of response and speed of recovery, preservation of device mechanical robustness, preservation of device hermiticity where desired, thinness of construction, sensitivity, determination of position or positions of force application, and noise rejection. The capacitors of the present disclosure have advantages, for example, in the areas of response speed and recovery speed, thinness, and determination of touch position.

SUMMARY

The present disclosure relates to force-sensing capacitor elements useful, for example, in electronic devices that include, for example much screen displays or other touch sensors and methods of making thereof. The present disclosure also relates to deformable membranes useful in the fabrication of the force-sensing capacitor elements. Force-sensing (and also force-measuring) capacitor elements are provided with electrodes and deformable membranes (e.g., insulators) having specific design features. The capacitor elements can be integrated within a display or electronic device, for example, to detect and measure the magnitude and/or direction of force or pressure applied to the display electronic device. The capacitor elements can be integrated, for example, at the periphery of or beneath a display, to sense or measure force applied to the display. Alternatively, the capacitor elements can be integrated within a touch pad, keyboard, a button, or digitizer (e.g., stylus input device), for example.

In one aspect, the present disclosure provides a deformable membrane comprising:
 a first layer having first and second major surfaces;
 a second layer having first and second major surfaces;
 a third layer having first and second major surfaces interposed between the second major surface of the first layer and the second major surface of the second layer;
 a first arrangement comprising a plurality of first structures, with corresponding first void regions, interposed between the second major surface of the first layer and the first major surface of the third layer, wherein each first structure has a first surface facing the second major surface of the first layer and a second surface facing the first major surface of the third layer; and
 a second arrangement comprising a plurality of second structures, with corresponding second void regions, interposed between the second major surface of the second layer and the second major surface of the third layer, wherein each second structure has a first surface facing the second major surface of the second layer and a second surface facing the second major surface of the third layer; and wherein
  i) from about 1% to about 99% of the plurality of first structures have first surfaces that each overlap through the thickness of the deformable membrane with one or more of the first surfaces or with one or more of the second surfaces of the plurality of second structures, or
  ii) from about 1% to about 99% of the plurality of first structures have second surfaces that each overlap through the thickness of the deformable membrane with one or more of the first surfaces or with one or more of the second surfaces of the plurality of second structures.

In another aspect, the present disclosure provides a force-sensing capacitor element comprising:
 a deformable membrane according to any one of deformable membranes described herein;
 at least one first electrode embedded within the first layer or proximate to or in contact with one of the first major surface and the second major surface of the first layer; and
 at least one second electrode embedded within the second layer or proximate to or in contact with one of the first major surface and the second major surface of the second layer.

In another aspect, the present disclosure provides a force-sensing capacitor element comprising:
 a deformable membrane according to any one of deformable membranes described herein; and
 at least one first electrode and at least one second electrode forming at least one electrode pair embedded within the first layer or proximate to or in contact with at least one of the first and the second major surfaces of the first layer, wherein each of the at least one first electrode and the at least one second electrode are separated by a gap; and
 optionally, a third electrode.

In some aspects, the third electrode is embedded within the second layer or proximate to or in contact with at least one of the first and the second major surfaces of the second layer and the third electrode overlaps with the at least one first electrode and the at least one second electrode through the thickness of the force-sensing capacitor element In another aspect, the present disclosure provides an electronic device comprising a force-sensing capacitor element according to any one of force-sensing capacitor elements described herein.

In another aspect, the present disclosure provides a touch screen display comprising a force-sensing capacitor element according to any one of force-sensing capacitor elements described herein.

The articles and methods of the present disclosure have a variety of advantages, including, but not limited to:
 i) compression of the deformable membrane includes a tailorable balance between the engineered bending of the third layer over at least a portion of the major surface area of the deformable membrane and compression of the first and second structures, owing to the spatial relationship between the first and second structures provided on separate layers within the deformable membrane and ii) the spatial relationship, through the thickness of the deformable membrane, of the first and second structures does not require registered fabrication, i.e. the first and second structures are not required, during fabrication, to be precisely aligned with each other through the thickness of the deformable membrane.

In another aspect, the present disclosure provides methods of making a deformable membranes and force-sensing capacitor elements.

BRIEF DESCRIPTION OF THE DRAWINGS

FIG. 6A is a schematic cross-sectional side view of an exemplary force-sensing capacitor element according to one exemplary embodiment of the present disclosure.

Figure 1:
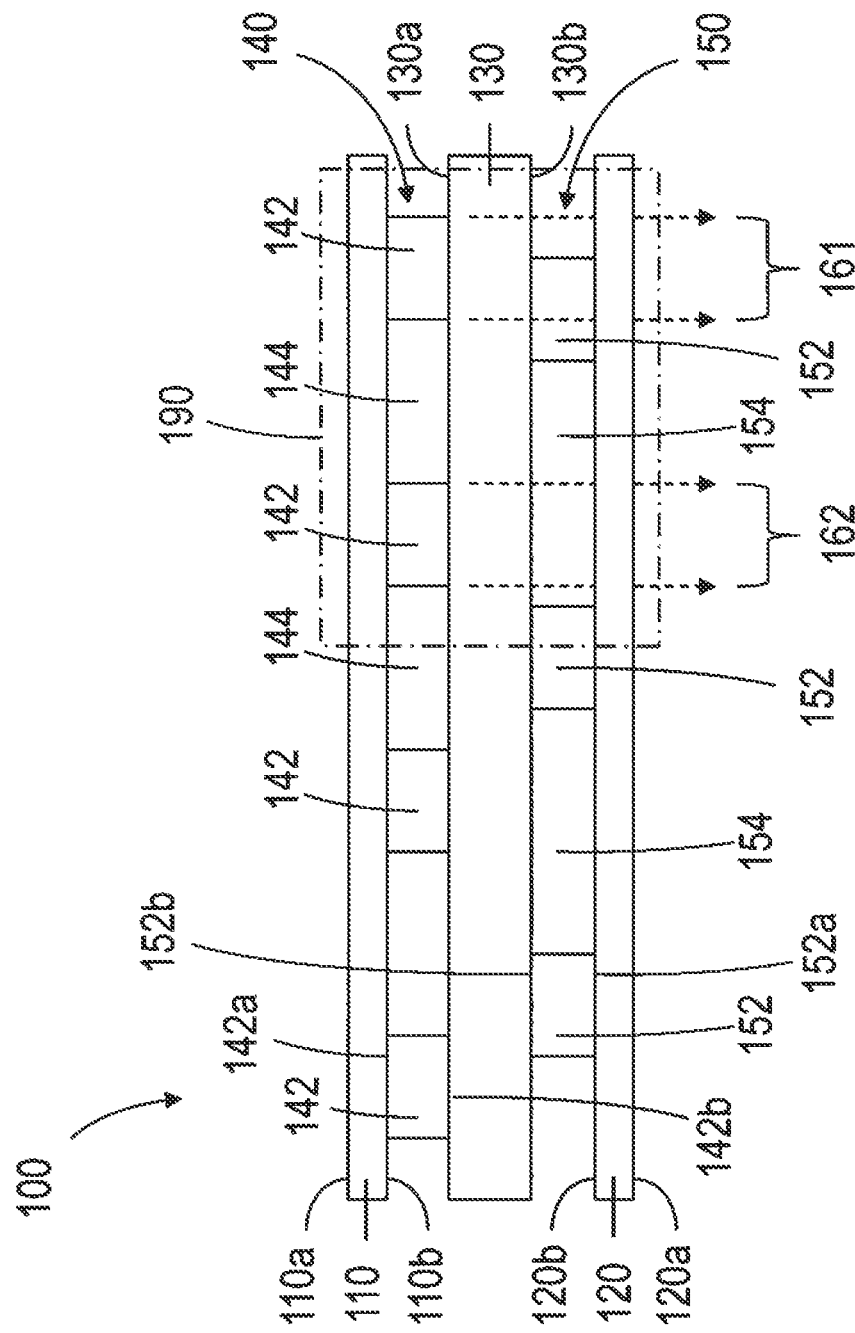
FIG. 1 is a schematic cross-sectional side view of an exemplary deformable membrane according to one exemplary embodiment of the present disclosure.

Repeated use of reference characters in the specification and drawings is intended to represent the same or analogous features or elements of the disclosure. As used herein, the word "between", as applied to numerical ranges, includes the endpoints of the ranges, unless otherwise specified. It should be understood that numerous other modifications and embodiments can be devised by those skilled in the art, which fall within the scope and spirit of the principles of the disclosure. The figures may not be drawn to scale.

All scientific and technical terms used herein have meanings commonly used in the art unless otherwise specified. The definitions provided herein are to facilitate understanding of certain terms used frequently herein and are not meant to limit the scope of the present disclosure.

Unless otherwise indicated, all numbers expressing feature sizes, amounts, and physical properties used in the specification and claims are to be understood as being modified in all instances by the term "about." Accordingly, unless indicated to the contrary, the numerical parameters set forth in the foregoing specification and attached claims are approximations that can vary depending upon the desired properties sought to be obtained by those skilled in the art utilizing the teachings disclosed herein.

The recitation of numerical ranges by endpoints includes all numbers within that range (e.g. 1 to 5 includes 1, 1.5, 2, 2.75, 3, 3.80, 4, and 5) and any range within that range.

As used in this specification and the appended claims, the singular forms "a", "an", and "the" encompass embodiments having plural referents, unless the context clearly dictates otherwise. As used in this specification and the appended claims, the term "or" is generally employed in its sense including "and/or" unless the context clearly dictates otherwise.

Throughout this disclosure, if one surface is in contact with another surface, the two surfaces are, inherently, facing each other.

DETAILED DESCRIPTION

An embodiment of a deformable membrane, according to the present disclosure includes a first layer having first and second major surfaces, a second layer having first and second major surfaces, a third layer having first and second major surfaces interposed between the second major surface of the first layer and the second major surface of the second layer, a first arrangement comprising a plurality of first structures, with corresponding first void regions, interposed between the second major surface of the first layer and the first major surface of the third layer, wherein each first structure has a first surface facing the second major surface of the first layer and a second surface facing the first major surface of the third layer, and a second arrangement comprising a plurality of second structures, with corresponding second void regions, interposed between the second major surface of the second layer and the second major surface of the third layer, wherein each second structure has a first surface facing the second major surface of the second layer and a second surface facing the second major surface of the third layer; and wherein i) from about 1% to about 99%, from about 2% to about 95%, from about 5% to about 90%, or even from about 10% to about 50% of the plurality of first structures have first surfaces that each overlap through the thickness of the deformable membrane with one or more of the first surfaces or with one or more of the second surfaces of the plurality of second structures, or ii) from about 1% to about 99%, from about 2% to about 95%, from about 5% to about 90%, or even from about 10% to about 50% of the plurality of first structures have second surfaces that each overlap through the thickness of the deformable membrane with one or more of the first surfaces or with one or more of the second surfaces of the plurality of second structures. In some embodiments, from about 1% to about 99%, from about 2% to about 95%, from about 5% to about 90% or even from about 10% to about 50% of the plurality of first structures have first surfaces that each overlap through the thickness of the deformable membrane with one or more of the first surfaces of the second structures. In other embodiments, from about 1% to about 99%, from about 2% to about 95%, from about 5% to about 90%, or even from about 10% to about 50% of the plurality of first structures have first surfaces that each overlap through the thickness of the deformable membrane with one or more of the second surfaces of the second structures. In some embodiments, from about 1% to about 99%, from about 2% to about 95%, from about 5% to about 90%, or even from about 10% to about 50% of the plurality of first structures have second surfaces that each overlap through the thickness of the deformable membrane with one or more of the first surfaces of the second structures. In other embodiments, from about 1% to about 99%, from about 2% to about 95%, from about 5% to about 90%, from about 10% to about 50% of the plurality of first structures have second surfaces that each overlap through the thickness of the deformable membrane with one or more of the second surfaces of the second structures. In some embodiments, from about 1% to about 99%, from about 2% to about 95%, from about 5% to about 90%, or even from about 10% to about 50% of the plurality of first structures have first and second surfaces that each overlap through the thickness of the deformable membrane with one or more of the first surfaces of the second structures. In some embodiments, from about 1% to about 99%, from about 2% to about 95%, from about 5% to about 90%, or even from about 10% to about 50% of the plurality of first structures have first and second surfaces that each overlap through the thickness of the deformable membrane with one or more of the second surfaces of the second structures. In some embodiments, from about 1% to about 99%, from about 2% to about 95%, from about 5% to about 90%, or even from about 10% to about 50%, of the plurality of first structures have first and second surfaces that each overlap through the thickness of the deformable membrane with one, or more of the first surfaces and the second surfaces of the second structures. In some embodiments, at least one of the first layer, second layer and third layer may be substantially planar, i.e. planar substrates. In another embodiment, first layer, second layer and third layer may be substantially planar. Several specific, but non-limiting, embodiments are shown in FIG. 1, FIG. 2 and FIGS. 3A-3C.

Referring now to FIG. 1, deformable membrane 100 includes a first layer 110 having first major surface 110a and second major surface 110b, a second layer 120 having first major surface 120a and second major 120b surface, a third layer 130 having first major surface 130a and second major surface 130b. Third layer 130 is interposed between the second major surface 110b of first layer 110 and second major surface 120b of second layer 120. The third layer is also referred to as a central web, herein. Deformable membrane 100 further includes a first arrangement 140 comprising a plurality of first structures 142, with corresponding first void regions 144, interposed between second major surface 110b of first layer 110 and first major surface 130a of third layer 130. Each first structure 142 has a first surface 142a facing second major surface 110b of first layer 110, a second surface 142b facing first major surface 130a of third layer 130. Deformable membrane 100 also includes a second arrangement 150 comprising a plurality of second structures 152, with corresponding second void regions 154, interposed between the second major surface 120b of the second layer 120 and the second major surface 130b of the third layer 130. Each second structure 152 has a first surface 152a facing the second major surface 120b of the second layer 120 and a second surface 152b facing the second major surface 130b of the third layer 130. The positional arrangement of the plurality of first structures 142 of the first arrangement 140, relative to the plurality of second structures 152 of second arrangement 150, is defined such that at least one of the following two criteria is met: i) from about 1% to about 99% of the plurality of first structures 142 have first surfaces 142a that each overlap through the thickness of the deformable membrane with one or more of the first surfaces 152a or with one or more of the second surfaces 152b of the plurality of second structures 152, or ii) from about 1% to about 99% of the plurality of first structures 142 have second surfaces 142b that each overlap through the thickness of the deformable membrane with one or more of the first surfaces 152a or with one or more of the second surfaces 152b of the plurality of second structures 152. The deformable membrane of FIG. 1 may represent a portion of a deformable membrane that spans further in length (lateral dimension). With further reference to FIG. 1, the region 161 represents a projection through the thickness of the deformable membrane of a first structure 142 having a first surface 142a and a second surface 142b that are each overlapping through the thickness of the deformable membrane with both a first surface 152a and a second surface 152b of a second structure 152. With further reference to FIG. 1, the region 162 represents a projection through the thickness of the deformable membrane for a first structure 142 having a first surface 142a and a second surface 142b that are each offset from all first surfaces 152a and all second surfaces 152b of second structures 152 such that there is no overlap through the thickness of the deformable membrane. As used herein, for a surface of a first structure, e.g. 142a and/or 142b, to "overlap" with a surface of a second structure, e.g. 152a and/or 152b, through the thickness of the membrane, the surface of the first structure at least partially overlaps with the surface of the second structure. For further clarity, for a surface of a first structure to overlap with a surface of a second structure, there is no requirement for the entire surface of the first structure to overlap with the entire surface of the second structure. In some embodiments, the amount of overlap between a surface of a first structure, e.g. 142a and/or 142b, with a surface of a second structure, e.g. 152a and/or 152b, will vary from first structure to first structure, depending on the size, density and positional arrangement of first structures relative to the size, density and positional arrangement of second structures. In some embodiments, an entire surface of a first structure, e.g. 142a and/or 142b, may overlap with a surface of a second structure, e.g. 152a and/or 152b, through the thickness of the deformable membrane.

Figure 2:
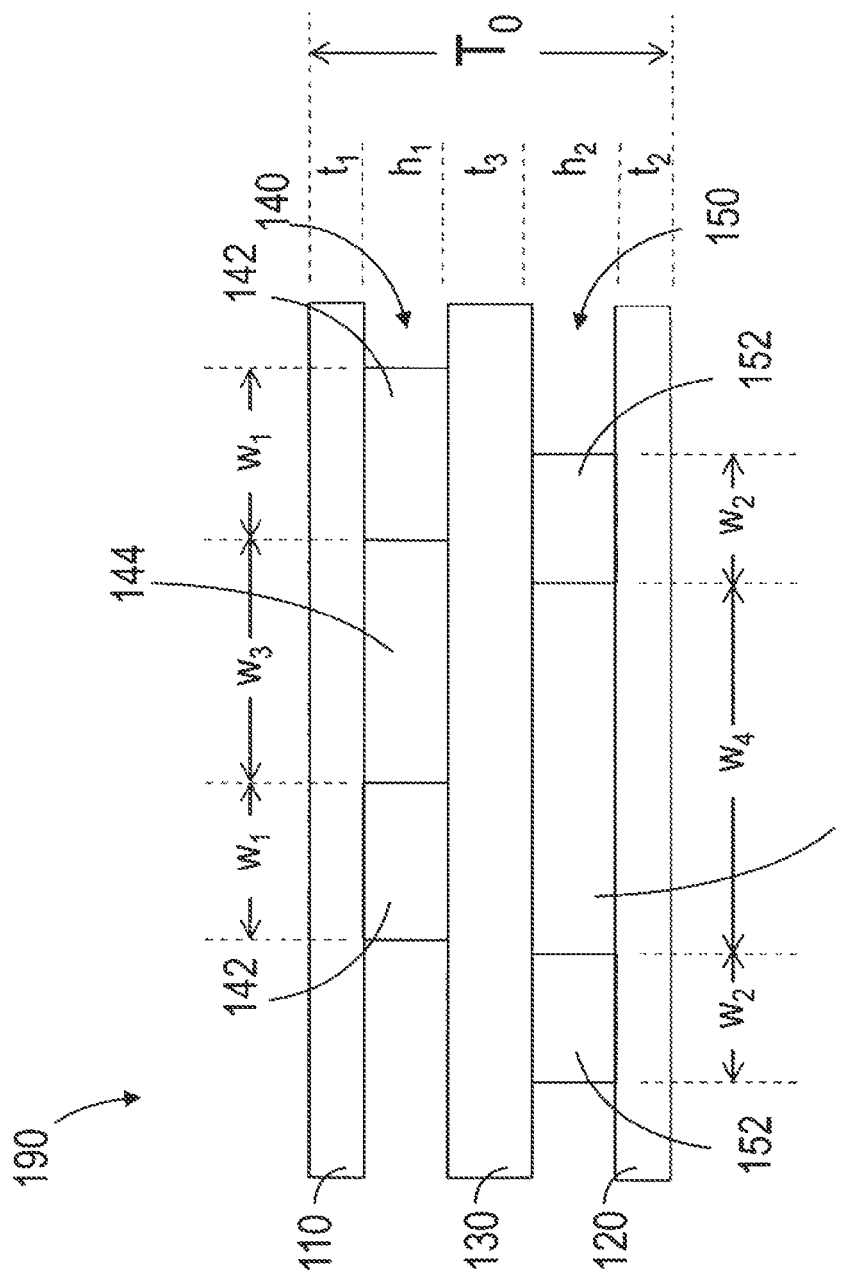
FIG. 2 is a schematic cross-sectional side view of cut-out 190 of the exemplary deformable membrane of FIG. 1 of the present disclosure.

FIG. 2 shows cut-out 190 of FIG. 1 in more detail including first layer 110, second layer 120, third layer 130, first structures 142 and first void regions 144 of first arrangement 140, and second structures 152 and second void regions 154 of second arrangement 150. The thicknesses $t_i$, heights $h_i$ and distance between nearest neighboring first structures $w_i$ of various elements included in deformable membrane 100 are shown. First layer 110, second layer 120 and third layer 130 have thickness $t_1$, $t_2$ and $t_3$, respectively. The deformable membranes of the present disclosure are not particularly limited with respect to thicknesses $t_1$, $t_2$ and $t_3$, although some thicknesses $t_1$, $t_2$ and $t_3$ may be particularly advantageous. The thicknesses $t_1$, $t_2$ and $t_3$ may each be, for example, greater than about 5 micrometers, greater than about 10 micrometers, greater than about 20 micrometers, greater than about 30 micrometers, greater than about 40 micrometers or even greater than about 50 micrometers; less than about 250, less than about 225 micrometers, less than about 200 micrometers, less than about 175 micrometers, or even less than 150 micrometers. Thicknesses $t_1$, $t_2$ and $t_3$ may each be, for example, between about 5 micrometers and about 250 micrometers, between about 10 micrometers and 200 micrometers, between about 15 micrometers and about 140 micrometers, about 20 micrometers and about 130 micrometers or even between about 25 micrometers and 100 about micrometers. The total thickness of the deformable membrane 100 is represented by $T_o$. $T_o$ varies depending on the selection of $t_1$, $t_2$, $t_3$, $h_1$ and $h_2$. The deformable membranes of the present disclosure are not particularly limited with respect to total thickness $T_o$. In some embodiments, $T_o$ is between about 50 micrometers and about 2 mm, in some embodiments between about 100 micrometers and about 1 mm, in some embodiments between about 150 micrometers and about 550 micrometers, and in some embodiments between about 200 micrometers and about 500 micrometers.

First layer 110, second layer 120 and third layer 130 may be fabricated from materials having a Young's modulus over a broad range. First layer 110, second layer 120 and third layer 130 may have a Young's modulus between, for example, about 0.1 MPa and about 100 GPa. The selection of the Young's modulus of each layer is based on the end-use application requirements for the deformable membrane 100 which will subsequently dictate the design criteria for the deformable membrane 100. In some embodiments, the Young's modulus of one or more of first layer 110, second layer 120 and third layer 130 may be required to be relatively high, providing a relatively stiff layer (e.g., a glass layer with Young's modulus of between about 50 GPa and about 100 GPa). In these embodiments, the Young's modulus of one or more of first layer 110, second layer 120 and third layer 130 may be greater than about 0.05 GPa, greater than about 0.1 GPa or even greater than about 1 GPa; less than about 100 GPa, less than about 10 GPa or even less than about 5 GPa. The Young's modulus may be between about 0.05 GPa and about 10 GPa, between about 0.1 GPa and about 10 GPa, between about 1 GPa and 10 GPa or even between about 1 GPa and about 5 GPa. In other embodiments, the Young's modulus of one or more of rust layer 110, second layer 120 and third layer 130 may be required to be relatively low, providing a relatively flexible layer (e.g., an elastomer, for example a silicone elastomer, with Young's modulus of between 0.5 and 5 Mpa). In these embodiments, the Young's modulus of one or more of first layer 110, second layer 120 and third layer 130 may be greater than about 0.1 MPa greater than about 1.0 MPa, greater than about 2.0 MPa, greater than about 5.0 MPa or even greater than about 10 MPa; less than about 50 MPa, less than about 40 MPa or even less than about 30 MPa. The Young's modulus may be between about 0.1 MPa and about 0.05 GPa, between about 1 MPa and about 40 MPa, between about 2 MPa and about 30 MPa or even between about 3 MPa and about 25 MPa. In some embodiments, the Young's modulus of the third layer is less than at least one of the Young's modulus of the first layer and second layer.

First layer 110, second layer 120 and third layer 130 may be dielectric materials, e.g. may include ceramic and polymeric materials (thermoplastics, thermoplastic elastomers and thermosets, including glassy thermosets and elastomeric thermosets, i.e. rubbers, and foams, including foamed rubbers). Suitable ceramic materials include, but are not limited to, glass, titanium dioxide, barium titanate, tantalum pentoxide, sapphire and the like. Suitable polymeric materials include, but are not limited to, polyesters (e.g. polyethylene terephthalate and polyethylene naphthalate), aramid polymer, polycarbonates, polyimides, polyamides (e.g. Nylon 6,6), polyalkylenes (e.g. polyethylene and polypropylene), polyether sulphones, polyether ether ketones (PEEKs), polyarylene ether nitriles (PENs), polyacrylates (e.g. acrylics or acrylic polymers), polystyrene, fluoropolymers (e.g. fluoroplastics and fluoroelastomers), and rubbers (e.g. ethylene propylene diene monomer rubber also referred to herein as EPDM rubber, silicone, neoprene, isoprene, natural rubber, and the like), epoxy, polyurethane, and the like. Two or more of first layer 110, second layer 120 and third layer 130 may include the same material, i.e. may be fabricated from the same material. In some embodiments all three layers include the same material. In other embodiments, each of the first layer, the second layer and the third layer may be different materials. Each of first layer 110, second layer 120 and third layer 130 may include multiple materials in the form of a blend or composite of materials or a laminate. A laminate is defined as two or more sheets of material coupled together to form a single structure. In some embodiments, one or more of first layer 110, second layer 120 and third layer 130 are not laminates.

Particularly useful materials for any of the first layer, second layer, third layer, plurality of first structures, and plurality of second structure are silicone elastomers. Silicone materials can be fabricated to include structures according to, for example, U.S. Publ. Patent Application No. 2013/040073 (Pett, et. al.).

First structures 142 and second structures 152 have heights, $h_1$ and $h_2$, respectively. The deformable membranes of the present disclosure are not particularly limited with respect to heights, $h_1$ and $h_2$, although some heights, $h_1$ and $h_2$, may be particularly advantageous. The heights $h_1$ and $h_2$ may each be, for example, greater than about 5 micrometers, greater than about 10 micrometers, greater than about 20 micrometers, greater than about 30 micrometers, greater than about 40 micrometers, greater than about 50 micrometers, greater than about 100 micrometers, greater than about 250 micrometers, greater than about 500 micrometers; less than about 1 millimeter, less than about 500 micrometers, less than about 250 micrometers, less than about 175 micrometers, or even less than 150 micrometers. Each of the heights $h_1$ and $h_2$ may be, for example, between about 5 micrometers and about 1 mm, between about 10 micrometers and about 500 micrometers between about 15 micrometers and about 250 micrometers, between about 25 micrometers and about 150 micrometers, between about 40 micrometers and about 125 micrometers, between about 45 micrometers and about 110 micrometers or even between about 50 micrometers and about 100 micrometers. The heights $h_1$, of first structures 142 may all be the same, within the normal tolerances of their manufacturing process. In these embodiments, first layer 110 and third layer 130 are substantially parallel to one another. The heights $h_1$, may vary, with the heights $h_1$ of each individual first structure 142 being within about 30%, about 20%, about 10% or even about 5% of the average value of all heights $h_1$. In embodiments where the heights, $h_1$ taper systematically across an area of the deformable membrane, the variation in heights $h_1$ may cause a variation in the distance between first layer 110 and third layer 130 and the two layers may not be substantially parallel to one another, and first layer 110 and second layer 120 may also not be substantially parallel to one another. The heights $h_2$, of second structures 152 may all be the same, within the normal tolerances of their manufacturing process. In these embodiments, second layer 120 and third layer 130 are substantially parallel to one another. The heights $h_2$, may vary, with the heights $h_2$ of each individual second structure 152 being within about 30%, about 20%, about 10% or even about 5% of the average value of all heights $h_2$. In embodiments where the heights, $h_2$ taper systematically across an area of the deformable membrane, the variation in heights $h_2$ may cause a variation in the distance between second layer 120 and third layer 130 and the two layers may not be substantially parallel to one another, and second layer 120 and first layer 110 may also not be substantially parallel to one another. In some embodiments, first layer 110, second layer 120 and third layer 130 may be substantially parallel to one another. First layer 110 may be substantially parallel to second layer 120. First layer 110 may be substantially parallel to third layer 130. Second layer 120 may be substantially parallel to third layer 130.

At least one of the first, second and third layers and at least one of the plurality of first structure of the first arrangement, and the plurality of second structure of the second arrangement of the second arrangement may include filler particles. Fillers include but are not limited to organic or inorganic particles or fibers, plasticizers, processing aides, thermal or UV/V is light inhibitors, flame retardants.

The deformable membranes of the present disclosure are not particularly limited with respect to widths $w_1$ and $w_2$, although some widths $w_1$ and $w_2$ may be particularly advantageous. First structures 142 have a widths $w_1$. The widths $w_1$ may be, for example, greater than about 5 micrometers, greater than about 10 micrometers, greater than about 20 micrometers, greater than about 30 micrometers, greater than about 40 micrometers or even greater than about 50 micrometers; less than about 5 mm, less than about 1 mm, less than about 0.5 mm, or even less than about 0.25 mm. The widths $w_1$ may be, for example, between about 5 micrometers and about 5 mm, between about 10 micrometers and about 1 mm, between about 10 micrometers and about 1 mm, between about 20 micrometers and about 0.5 mm, between about 30 micrometers and about 0.25 mm or even between about 40 micrometers and about 200 micrometers. The widths $w_1$ of first structures 142 may all be the same, within the normal tolerances of their manufacturing process, or may vary within the size range described above.

The average width of a plurality of first structures, i.e. the sum of each individual average width of each first structure (the average width of an individual first structure being the angular average of widths across the entire first structure) divided by the number of first structures, may be, for example, greater than about 5 micrometers, greater than about 10 micrometers, greater than about 20 micrometers, greater than about 30 micrometers, greater than about 40 micrometers or even greater than about 50 micrometers; less than about 5 mm, less than about 1 mm, less than about 0.5 mm, or even less than about 0.25 mm. The average width of the plurality of first structures may be, for example, between about 3 micrometers and about 5 mm, between about 10 micrometers and about 1 mm, between about 10 micrometers and about 1 mm, between about 20 micrometers and about 0.5 mm, between about 30 micrometers and about 0.25 min or even between about 40 micrometers and about 200 micrometers. When the plurality of first structures includes one or more first structures that have varying width, e.g. a tapered structure, the width of each structure is taken as the average of the narrowest and widest portion of the structure.

Widths $w_3$ represents the distance between nearest neighboring first structures 142. The deformable membranes of the present disclosure are not particularly limited with respect to widths $w_3$. The widths $w_3$ may be, for example, greater than about 20 micrometers, greater than about 50 micrometers, greater than about 100 micrometers, greater than about 200 micrometers, greater than about 300 micrometers or even greater than about 400 micrometers; less than about 20 mm, less than about 15 mm, less than about 10 mm, less than about 5 mm, or even less than about 1 mm. The widths $w_3$ may be, for example, between about 20 micrometers and about 20 mm, between about 10 micrometers and about 1 mm, between about 20 micrometers and about 0.5 mm, between about 30 micrometers and about 0.25 mm or even between about 40 micrometers and about 200 micrometers. The widths $w_3$ may all be the same, within the normal tolerances of their manufacturing process, or may vary within the size range described above.

The average distance between nearest neighboring first structures, i.e. the sum of each individual distance, $w_3$, between neighboring first structures divided by the number of first structures, may be, for example, greater than about 20 micrometers, greater than about 50 micrometers, greater than about 100 micrometers, greater than about 200 micrometers, greater than about 300 micrometers or even greater than about 400 micrometers; less than about 20 mm, less than about 15 mm, less than about 10 mm, less than about 5 mm, or even less than about 1 mm. The average distance between nearest neighboring first structures may be, for example, between about 20 micrometers and about 20 mm, between about 10 micrometers and about 1 mm, between about 20 micrometers and about 0.5 mm, between about 30 micrometers and about 0.25 mm or even between about 40 micrometers and about 200 micrometers. When the plurality of first structures includes one or more first structures that have varying width, e.g. a tapered structure, creating one or more distances between nearest neighboring first structures that have varying distances there between, the distance between nearest neighboring first structures is taken as the average of the narrowest and widest portion of distances between nearest neighboring first structures. Each first structure is considered to have a single nearest neighbor. If a given first structure has two or more nearest neighboring first structures being separated from the given first structure by the same distance, only one nearest neighboring distance is counted to determine the above average.

The second structures 152 have widths $w_2$. The widths $w_2$ may be, for example, greater than about 5 micrometers, greater than about 10 micrometers, greater than about 20 micrometers, greater than about 30 micrometers, greater than about 40 micrometers or even greater than about 50 micrometers; less than about 10 mm, less than about 5 mm, less than about 1 mm, less than about 0.5 mm, or even less than about 0.25 mm. The widths $w_2$ may be, for example, between about 5 micrometers and 10 mm, between about 10 micrometers and about 1 mm, between about 20 micrometers and about 0.5 mm, between about 30 micrometers and about 0.25 mm or even between about 40 micrometers and about 200 micrometers. The widths $w_2$ of the second structures 152 may all be the same, within the normal tolerances of their manufacturing process, or may vary within the size range described above.

The average width of a plurality of second structures, i.e. the sum of each individual average width of each second structure (the average width of an individual second structure being the angular average of widths across the entire second structure) divided by the number of second structures, may be, for example, greater than about 5 micrometers, greater than about 10 micrometers, greater than about 20 micrometers, greater than about 30 micrometers, greater than about 40 micrometers or even greater than about 50 micrometers, less than about 5 mm, less than about 1 mm, less than about 0.5 mm, or even less than about 0.25 mm. The average width of the plurality of second structures may be, for example, between about 5 micrometers and about 5 mm, between about 10 micrometers and about 1 mm, between about 10 micrometers and about 1 mm, between about 20 micrometers and about 0.5 mm, between about 30 micrometers and about 0.25 mm or even between about 40 micrometers and about 200 micrometers. When the plurality of second structures includes one or more second structures that have varying width, e.g. a tapered structure, the width of each structure is taken as the average of the narrowest and widest portion of the structure.

In some embodiments, the average width of the plurality of first structures and the average width of the plurality of second structures are between about 5 micrometers and about 5 millimeters. In other embodiments, the average width of the plurality of first structures is approximately equal to the average width of the plurality of second structures. In yet other embodiments, the average width of the plurality of first structures is at least 25 percent larger than the average width of the plurality of second structures.

In some embodiments, the average width of the plurality of first structures and the average width of the plurality of second structures are between about 5 micrometers and about 5 millimeters. In some embodiments, the average width of the plurality of first structures is approximately equal to the average width of the plurality of second structures. In some embodiments, the average width of the plurality of first structures is at least 10 percent, at least 25 percent, at least 50 percent, at least 75 percent, or even at least 100 percent larger than the average width of the plurality of second structures. In other embodiments, the average width of the plurality of second structures is at least 10 percent, at least 25 percent, at least 50 percent, at least 75 percent, or even at least 100 percent larger than the average width of the plurality of first structures.

Widths $w_4$ represents the distance between nearest neighboring second structures 152. The deformable membranes of the present disclosure are not particularly limited with respect to widths $w_4$. The widths $w_4$ may be, for example, greater than about 20 micrometers, greater than about 50 micrometers, greater than about 100 micrometers, greater than about 200 micrometers, greater than about 300 micrometers or even greater than about 400 micrometers; less than about 20 mm, less than about 15 mm, less than about 10 mm, less than about 5 mm, or even less than about 1 mm. The widths $w_4$ may be, for example, between about 20 micrometers and about 20 mm, between about 10 micrometers and about 1 mm, between about 20 micrometers and about 0.5 mm, between about 30 micrometers and about 0.25 mm or even between about 40 micrometers and about 200 micrometers. The widths $w_4$ may all be the same, within the normal tolerances of their manufacturing process, or may vary within the size range described above.

The average distance between nearest neighboring second structures, i.e. the sum of each individual distance, $w_4$, between neighboring second structures divided by the number of second structures, may be, for example, greater than about 20 micrometers, greater than about 50 micrometers, greater than about 100 micrometers, greater than about 200 micrometers, greater than about 300 micrometers or even greater than about 400 micrometers; less than about 20 mm, less than about 15 mm, less than about 10 mm, less than about 5 mm, or even less than about 1 mm. The average distance between nearest neighboring second structures may be, for example, between about 20 micrometers and about 20 mm, between about 10 micrometers and about 1 mm, between about 20 micrometers and about 0.5 mm, between about 30 micrometers and about 0.25 mm or even between about 40 micrometers and about 200 micrometers. When the plurality of second structures includes one or more second structures that have varying width, e.g. a tapered structure, creating one or more distances between nearest neighboring second structures that have varying distances there between, the distance between nearest neighboring second structures is taken as the average of the narrowest and widest portion of distances between nearest neighboring second structures. Each second structure is considered to have a single nearest neighbor. If a given second structure has two or more nearest neighboring second structures being separated from the given second structure by the same distance, only one nearest neighboring distance is counted to determine the above average.

The disclosure is not particularly limited with respect to the in-plane shapes (or stated differently, the shapes of first surfaces 142a and 152a and second surfaces 142b and 152b) of the first and second structures. Examples of useful shapes include circles, ovals, rectangles (including squares), triangles, parallelograms (including rhombuses), dashes, arcs, or freeform shapes. The lateral shapes of the first and second structures need not be solid. They can include one or more interior voids. One example of a lateral shape including a single interior void is the ring. The shapes of the first structures and the shapes of the second structures need not be the same. Some or all of the shapes of the first surfaces 142a and 152a and second surfaces 142b and 152b may all be the same. Some or all of the shapes of the first surfaces 142a and 152a and second surfaces 142b and 152b may different.

The volumetric shape of first structures an the second structures are not particularly limited. The volumetric shapes of the first structures and the second structures may be, for example, at least one of prismatoid, for example any of cylinders, elliptical pillars, truncated pyramids, parallelepipeds, domes, truncated domes, spheres, truncated spheres, truncated ellipsoids, pyramids, wedges, or prisms. The volumetric shapes of the first structures and the second structures may include, but are not limited to, cubic, cylindrical, prismatic, pyramidal, truncated pyramidal, conical, truncated conical, ellipsoidal, spheroidal, hemispherical and combinations thereof. The volumetric shape of the plurality first structures and the plurality of second structures may be parallelepiped, e.g. rectangular parallelepiped. Some or all of the volumetric shapes of the first structures and second structures may all be the same. Some or all of the shapes of the first structures and second structures may different. Volumetric shapes that include differing first and second suffice areas, e.g. truncated pyramidal and truncated conical, for at least the first structure can lead to conditions wherein the overlap through the thickness of the deformable membrane of the first surface of the first structure with at least one of the first and second surface of the second structure is different from the overlap of the second surface of the first structure with at least one of the first and second surface of the second structure. A similar situation may occur if the second structure or both the first and second structures have volumetric shapes that include differing first and second surface areas.

The first structures and the second structures may be dielectric materials, e.g. ceramic and polymeric materials (thermoplastics, thermoplastic elastomers and thermosets, including glassy thermosets and elastomeric thermosets, i.e. rubbers). Suitable ceramic materials mid polymeric materials include, but are not limited to, those described for first layer 110, second layer 120 and third layer 130.

At least some of the first structures of the first arrangement and at least some of the second structures of the second arrangement may be isolated discrete structures, i.e. no portion of an individual structure is connected to another portion of a different individual structure as shown in FIG. 1, fabricated by, for example, a three-dimensional printing process. At least some of first structures of the first arrangement and at least some of the second structures of the second arrangement may be connected discrete structures, i.e. discrete structures connected by a land region having a height at least about 75% less than, at least about 50% less than, at least about 25% less than, at least about 10% less than or even at least about 5% less than the height of the structure, fabricated by, for example, an embossing or micro-replication process. In some embodiments, a planar film encompassing the land region and corresponding portions of the plurality of first structures of the first arrangement and the plurality of second structures of second arrangement may be the third layer. The land region between two structures in a given arrangement is not regarded as being a portion of either structure and is not regarded as being a structure, with respect to the definition of overlap between first or second surfaces of the first and second structures.

Except for the previously noted overlap requirement through the thickness of the deformable membrane of the surfaces of the first structures and the second structures, this disclosure is not particularly limited with respect to the positional arrangement of the first structures of the first arrangement, i.e. the location or pattern of the first structures of the first arrangement, and the positional arrangement of the second structures of the second arrangement. The positional arrangement of one or both of the first structures of the first arrangement and second structures of the second arrangement may include one or more arrays comprising a series of repeating lattice of positions, including, but not limited to a square array, a triangular array, rectangular (non-square) array, a hexagonal array and the like. Combinations of arrays, i.e. patterns, may be used. In some embodiments, the first structures of the first arrangement are arranged according to a first array comprising a series of repeating lattice of positions. In some embodiments, the second structures of the first arrangement are arranged according, to a second array comprising a series of repeating lattice of positions. In some embodiments, the first structures of the first arrangement are arranged according to a first array comprising a series of repeating lattice of positions and the second structures of the first arrangement are arranged according to a second array comprising a series of repeating lattice of positions. In other embodiments, first array comprising a series of repeating lattice of positions and the second array comprising a series of repeating lattice positions are the same array.

The positional arrangement of the plurality of first structures of the first arrangement and the plurality of second structures of the second arrangement may be a partially random positional arrangement of structures or a completely random positional arrangement of structures. A partially random positional arrangement of structures can be created by placing one structure at each of an arrangement of partially random locations, the partially random locations being determined as follows, for example. The locations may be generated by first providing starting arrangements of first and second structures in the form of the same regular array having a characteristic repeat distance, P, between neighboring starting positions (e.g., square array, where P is the pitch between positions). Next, in the partial randomization step, each starting position may be translated by a random distance, D, in a random direction between 0 degrees and 360 degrees. In some embodiments, D is less than P. The partially random arrangement of structures is then created by placing a structure at each of at least a portion of the partially random locations. A completely random arrangement of structures can be generated by analogous sequence of steps, except where the locations for placement of each structure are completely random, as generated by computer algorithms that are known in the art. In some embodiments, at least one of the first structures of the first arrangement and the second structures of the second arrangement are arranged according to at least a partially random positional arrangement of structures. In some embodiments, the plurality of first structures of the first arrangement and the plurality of second structures of the second arrangement are arranged according to at least a partially random positional arrangement.

The spatial configuration of the first structures of the first arrangement relative to the second structures of the second arrangement is limited by the previously stated overlap requirement through the thickness of the deformable membrane of the surfaces of the first structures and the second structures. There are a number of variables that may influence the overlap between given surfaces of structures, including but not limited to, the sizes and shapes of first surfaces 142a and 142b and the sizes and shapes of second surfaces 152a and 152b, which are determined by the sizes and shapes of the first structures 142 and second structures 152, the fill factor, $F_1$, which is defined for each individual set of surfaces 142a, 142b, 152a, 152b (see below equation), the positional arrangement of the first structures of first arrangement and the second structures of the second arrangement and the spatial configuration of the first arrangement relative to the second arrangement. One of skill in the art can recognize multiple ways to achieve numerous spatial configurations that meet the overlap requirement by adjusting one or more of these variables accordingly.

$$F_n = \left(\frac{\sum_{i=1}^{n} a_i}{A}\right)$$

Fn: represents the fill factor for a specific set of surfaces (first surfaces or second surfaces) of a specific set of a structures (first structures or second structures). The value can be expressed as a percentage.

i: represents one structure (first structure or second structure) within a surface area A of the deformable membrane.

a: represents the area of a specific surface (first surface or second surface) of a specific structure i (a first structure or second structure).

n: represents the number of structures in a given arrangement of structures, the number of first or second structures, within a surface area A of the deformable membrane.

In some embodiments, at least partially randomized spatial configuration, between the first arrangement 140 of plurality of first structures 142 relative to the second arrangement 150 of second structures 152, may be used. Preferably the first arrangement (described by the shapes and locations of the first structures, as viewed or rendered from one major surface of the deformable membrane) is different from the second arrangement (described by the shapes and locations of the second structures, as viewed or rendered from the same major surface of the deformable membrane). To preserve relative uniformity of compressibility (e.g., as measured for a compression area encompassing at least 10 structures, or for compression area encompassing at least 100 structures) for different compression area regions of the compressible membrane, it is important that fluctuations in the proportion of first structures that overlap second structures be minimized. One category of approaches for assuring a degree of uniformity of compressibility for different compression area regions, for deformable membranes of the present disclosure, includes fabricating the membranes with precise positional control over the position of each and every first structure and each and every second structure, the positions of the first structures being highly correlated with the positions of the second structures, and thus engineering the positional configuration of overlapping surfaces and non-overlapping surfaces for the first structures and the second structures. Such precise control of positions for the first structures and positions for the second structures, described differently as simultaneous control, may present significant manufacturing challenges, depending on the design of the arrangements and the materials of construction. Specifically, positional errors that may be described as non-zero phase shifts between the two arrangements may lead to deviations from the intended proportions of the first structures that overlap with the second structures through the thickness of the membrane. Some phase shifts may lead to an increase within a given compression area in the proportion of the first structures that overlap with the second structures, while other phase shifts may lead to a decrease within a given compression area in the proportion of the first structures that overlap with the second structures. In a second category of approaches for assuring a degree of uniformity of compressibility for different compression area regions, the first arrangement and the second arrangement are designed so that phase shifts between the two arrangements do not lead to large such variations in the proportions of first structures that overlap with second structures, for various compression area regions. In this second category of approaches, the first arrangement and the second arrangement are not as highly correlated. The lower degree of correlation relaxes the need for precise control over the phase relationship between the first arrangement and the second arrangement, in manufacturing. A lower degree of correlation can be created in a number of different ways, and the present disclosure is not limited in the means for achieving low correlation between the first arrangement and the second arrangement. In one approach of the second category, the spatial configuration of the second arrangement of second structures relative to the first arrangement of first structures may be determined as a rotation of the first arrangement of first structures. More specifically, a bias angle may be defined between the first arrangement of first structures and the second arrangement of second structures, wherein the two arrangements differ only by the bias angle. If the shapes and/or sizes of the first structures are different from the shapes and/or sizes of the second structures, the locations (e.g., centroids) of the first structures can be defined according to a first pattern of first locations and the locations (centroids) of the second structures can be defined according to a second pattern of second locations, wherein the two patterns of locations (e.g., centroids) differ only by a bias angle. The point of rotation of the first arrangement relative to the second arrangement, creating the bias angle, may be taken, for example, at a first structure at or near the center of the first arrangement. The point of rotation of the first arrangement relative to the second arrangement, creating the bias angle, may be taken, for example, at a first structure at or near the edge of the first arrangement. The point of rotation of the first arrangement relative to the second arrangement, creating the bias angle, may be taken, for example, at a first structure at or near the corner of the first arrangement. The point of rotation of the first arrangement relative to the second arrangement, creating the bias angle, may be taken, for example, at any position between structures.

The first repeating lattice of positions and the second repeating lattice of positions differ by a non-zero bias angle. The bias angle may be greater than about 5 degrees, greater than about 10 degrees, greater than about 20 degrees, greater than about 30 degrees, greater than about 40 degrees, greater than about 50 degrees; less than about 175 degrees less than about 150 degrees, less than about 125 degrees, less than about 100 degrees, less than about 85 degrees, less than about 75 degrees or even less than about 60 degrees. The bias angle may be between about 5 degrees and about 175 degrees, between about 10 degrees and 150 degrees, between about 10 degrees and about 120 degrees, between about 10 degrees and about 100 degrees or even between about 10 degrees and about and about 80 degrees.

For each deformable membrane, each first structure has a first fill factor and a second fill factor based on the first set of first surfaces and the second set of first surfaces, respectively, and each second structure has a first fill factor and a second fill factor based on the first set of second surfaces and the second set of second surfaces, respectively. In a given region of a deformable membrane or a force-sensing capacitor element including a deformable membrane, for example a compressible area having at least 10 first structures and at least 10 second structures (or, for example, a compressible area having at least 100 first structures and, at least 100 second structures), a given fill factor may be greater than about 1%, greater than about 2%, greater than about 5%, greater than about 7%, or even at least about 10%; less than 90%, less than about 75%, less than about 50%, less than 45%, less than 30 or even less than about 25%. In some embodiments, the fill factor may be between about 1% and about 90%, between about 1% and about 75%, between about 1% and about 60%, between about 2% and about 50%, between about 5% and about 45%, between about 7%, and 30% or even between about 10% and 25%. The region of the deformable membrane of the force sensing capacitor element used to define the first fill factor may have a surface area greater than about 1%, greater than about 5%, greater than about 10%, greater than about 20%, greater than about 30%, greater than about 40% or even greater than about 50% of the total surface area of the force-sensing capacitor element; less than about 99%, less than about 95%, less than about 90%, less than about 80%, less than about 70% or even less than about 60% of the total surface area of the deformable membrane or force-sensing capacitor element. In some embodiments, at least one of the first and second fill factors of the first structures is between about 1 percent and about 60 percent and at least one of the first and second fill factors of the second structures is between about 1 percent and about 60 percent. In some embodiments, at least one of the first and second fill factors of the first structures is between about 2 percent and about 50 percent and at least one of the first and second fill factors of the second structures is between about 2 percent and about 50 percent. In some embodiments, at least one of the first and second fill factors of the first structures is between about 5 percent and about 45 percent and at least one of the first and second fill factors of the second structures is between about 2 percent and about 45 percent.

The number of first structures 142 of first arrangement 140 and one or more second structures 152 of second arrangement 150 are not particularly limited and may be selected based on the end use requirements. As the deformable membranes may be used in force-sensing capacitor elements, useful in, for example a touch screen display, the resolution requirements of the touch screen display may dictate the resolution requirements of the force-sensing capacitor element and subsequently the design, e.g. number of first and second structures, the pattern of first and second structures and the size of the first and second structures. The areal density of first structures 142 and one or more second structures 152 may each be greater than about 0.04 structures/cm$^2$, greater than about 1 structures/cm$^2$, greater than about 10 structures/cm$^2$, greater than about 100 structures/cm$^2$ or even greater than about 1,000/cm$^2$ structures; less than about 1,000,000 structures/cm$^2$, less than about 500,000 structures/cm$^2$, less than about 100,000 structures/cm$^2$, less than about 50,000 structures/cm$^2$ or even less than about 10,000 structures/cm$^2$.

Figure 3A:
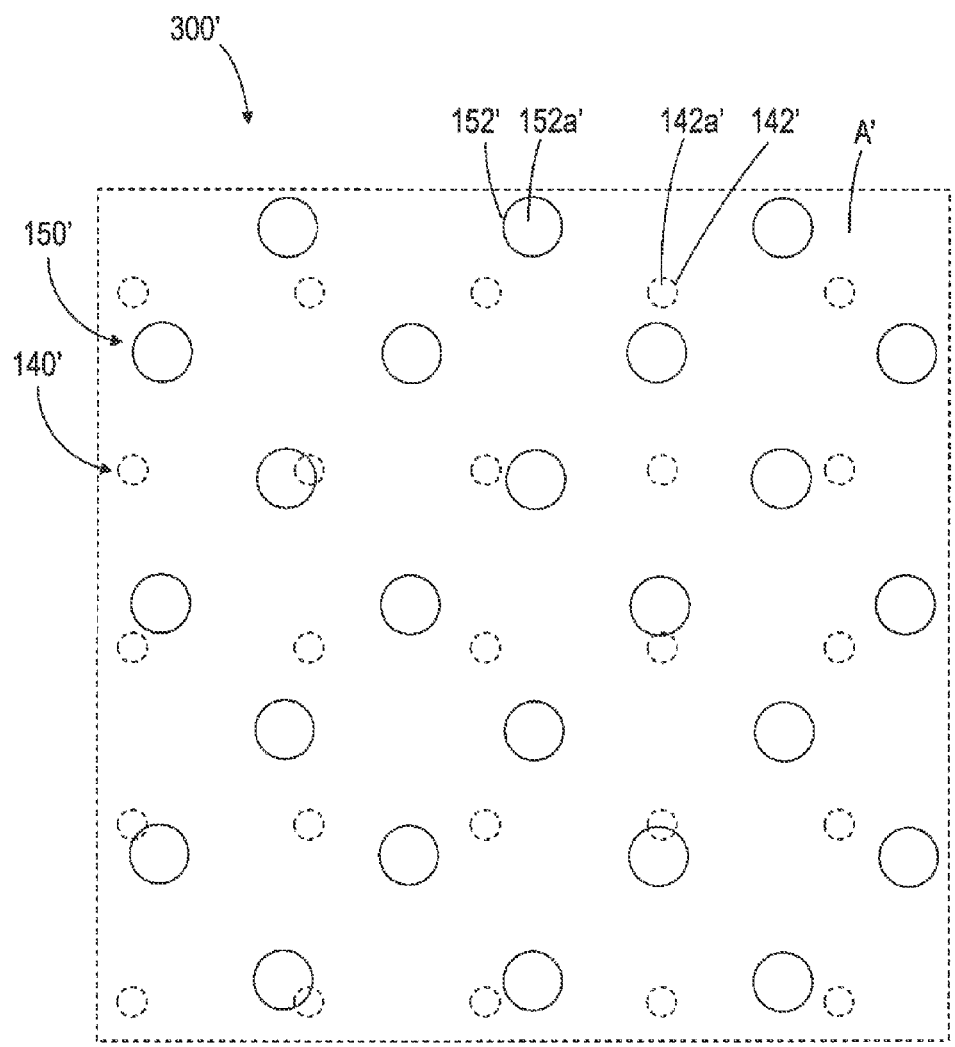
FIG. 3A is a schematic cross-sectional top view of an exemplary deformable membrane, through an imaginary plane of arrangement 150, according to one exemplary embodiment of the present disclosure.
Figure 3B:
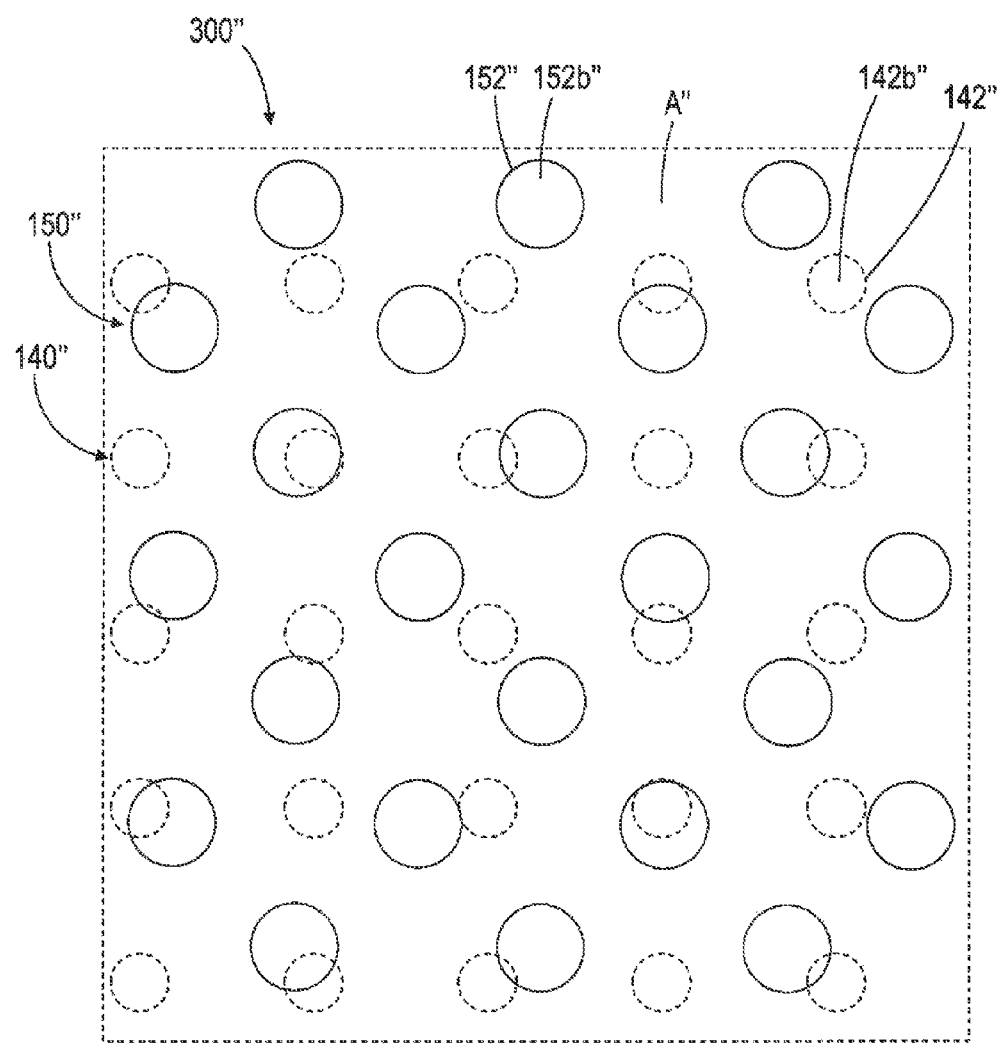
FIG. 3B is a schematic cross-sectional top view of an exemplary deformable membrane, through an imaginary plane of arrangement 150, according to one exemplary embodiment of the present disclosure.
Figure 3C:
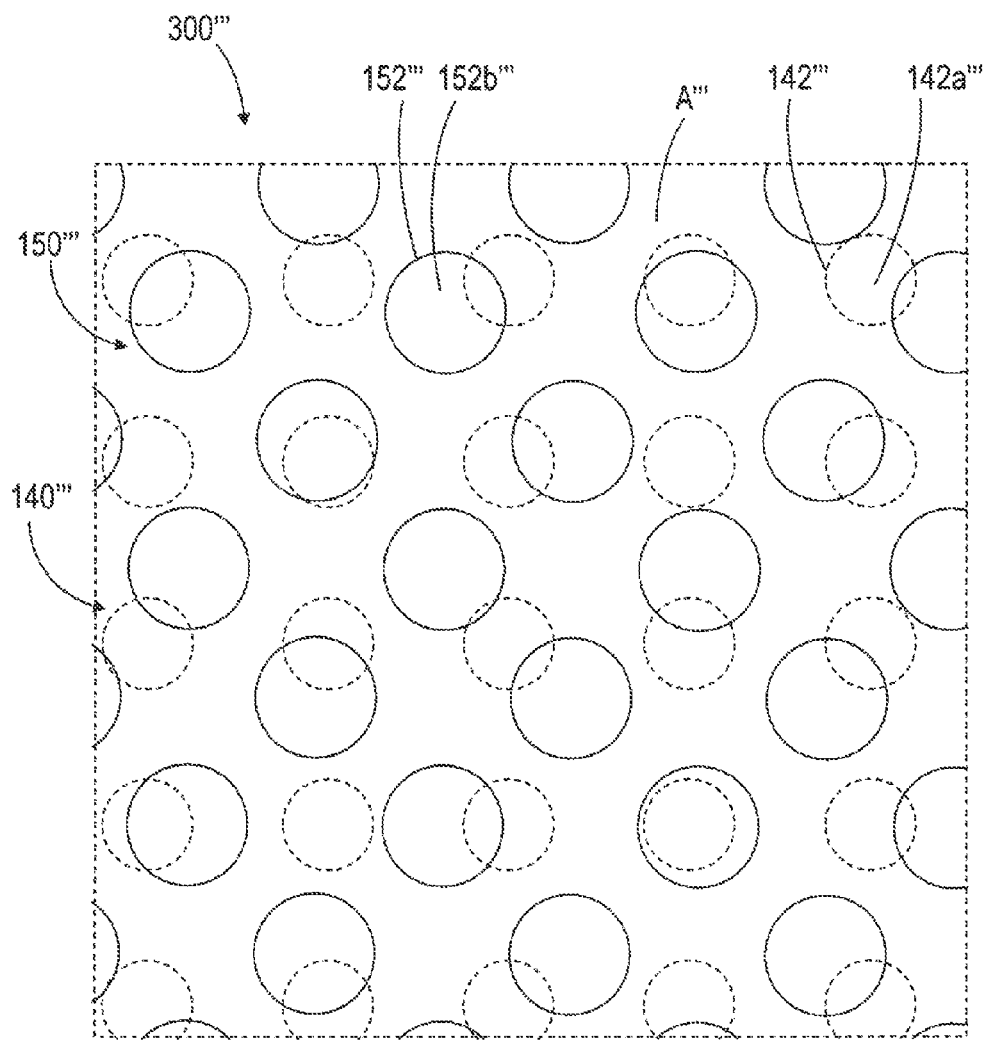
FIG. 3C is a schematic cross-sectional top view of an exemplary deformable membrane, through an imaginary plane of arrangement 150, according to one exemplary embodiment of the present disclosure.

FIGS. 3A through 3C are schematic cross-sectional top view diagrams through an imaginary plane of arrangement 150 of exemplary deformable membranes. The plane may run through the first surfaces 152a or the second surfaces 152b of second structures 152, as described in FIG. 1A, and the intersection of the plane with either set of surfaces are represented by solid lines, e.g. solid circles in FIGS. 3A through 3C. Projections of either the first surface 142a or second surface 142b of first structures 142 onto the plane, as described in FIG. 1A, are represented by dashed lines, e.g. dashed circles in FIG. 3A through 3C. In the discussion that follows, the shape of each first structure, and each second structure is a cylinder. As such, the shape (circular) and area of the first surfaces and second surfaces of each first structure are all the same and the shape (circular) and area of the first surfaces and second surfaces of each second structure are all the same. These figures exemplify how the amount of overlap of the first surfaces or the second surfaces or the first structures with one or more of the first surfaces or the second surfaces of the second structures can change with changing fill factor, in this case changing diameter of the first and/or second structures. In FIGS. 3A through 3C, the spatial configuration between the first arrangement of first structures and second arrangement of second structures may be obtained as follows. First, the first arrangement of first structures and the second arrangement of second structures are both defined as a square grid array of structures, each having the same pitch, i.e. distance between the centroids of nearest neighboring features, of 300 micrometers. To generate the two arrays, a series of design steps may be taken. First, the two arrays are aligned so that every first structure of the first arrangement aligns through the thickness of the deformable membrane with a second structure of the second arrangement. The center point of the circular surface of each first structure aligns with the center point of a circular surface of each second structure. The second arrangement of second structures is then biased, i.e. rotated, 45 degrees relative to the first arrangement of first structures to obtain the desired spatial configuration having a reduced degree of correlation. The position of the axis of rotation within the array of second structures may be selected randomly. In the embodiments represented in FIGS. 3A through 3C, the axis of rotation was taken at the center of one square of a randomly selected square grid array and, thus, the axis of rotation did not coincide with a structure. FIGS. 3A through 3C only show a portion of the positional arrays of first and second structures and the axis of rotation is not shown in the diagrams. By changing the fill factor of one or both of the first arrangement of first structures and the second arrangement of second structures, the fraction of the number of first structures that have first surfaces or second surfaces that overlap through the thickness of the deformable membrane with one or more the first surfaces or one or more of the second surfaces of the second structures can be purposefully changed.

In an exemplary embodiment of a deformable membrane, FIG. 3A shows a portion of an imaginary plane 300' having area A' that intersects first surfaces 152a' of second structures 152' of second arrangement 150'. In plane 300', projections 142a' of the first surfaces of first structures 142' (a projection) of first arrangement 140' (a projection) are also shown and provide an understanding of the spatial configuration of the first arrangement of first structures relative to the second arrangement of second structures. Overlap, through the thickness of the deformable membrane, of the first surfaces of first structures (shown as projection 142a') with one or more second surfaces 152a' is observed for some first and second structures. In this embodiment, the diameter of the first structures is set at 50 micrometers with a fill factor of 2.2% and the diameter of the second structures is set at 100 micrometers with a fill factor of 8.7%. Inspection indicates that the proportion of first structures that have first surfaces that overlap (at least partially overlap) through the thickness of the deformable membrane with at least one first surface of a second structure is approximately 22% for a membrane design having these design parameters. The fill factors are calculated based on area A', and A' is selected such that the fill factor of a region of the deformable membrane would represent the value for the entire deformable membrane having first and second arrangements of structures.

In another exemplary embodiment of a deformable membrane, FIG. 3B shows a portion of an imaginary plane 300" having area A" that intersects second surfaces 152b" of second structures 152" of second arrangement 150". In plane 300", projections 142b" of second surfaces of first structures 142" (a projection) of first arrangement 140" (a projection) are also shown and provide an understanding of the spatial configuration of the first arrangement of first structures relative to the second arrangement of second structures. Overlap, through the thickness of the deformable membrane, of the second surfaces of the first structures (shown as projection 142a") with one or more second surfaces 152b" is observed for some first and second structures. In this embodiment, the diameter of the first structures is set at 100 micrometers with a fill factor of 8.7% and the diameter of the second structures is set at 150 micrometers and a fill factor of 19.6%. Inspection indicates that the proportion of first structures that have second surfaces that overlap (at least partially overlap) through the thickness of the deformable membrane with at least one first surface of a second structure is approximately 57% for a membrane design having these design parameters. The fill factors are calculated based on area A" and A" is selected such that the fill factor of a region of the deformable membrane would represent the value for the entire deformable membrane having first and second arrangements of structures.

In yet another exemplary embodiment of a deformable membrane, FIG. 3C shows a portion of an imaginary plane 300''' having area A''' that intersects second surfaces 152b''' of second structures 152''' of second arrangement 150'''. In plane 300''', projections 142a''' of first surfaces of first structures 142''' (a projection) of the first arrangement 140''' (a projection) are also shown and provide an understanding of the spatial configuration of the first arrangement of first structures relative to the second arrangement of second structures. Overlap, through the thickness of the deformable membrane, of the first structures (shown as projection 142a''') with one or more second surfaces 152b''' is observed for some first and second structures. In this embodiment, the diameter of the first structures is set at 150 micrometers with a fill factor of 19.6% and the diameter or the second structures is set at 200 micrometers and a fill factor of 34.9%. Inspection indicates that the proportion of first structures that have first surfaces that overlap (at least partially overlap) through the thickness or the deformable membrane with at least one first surface of a second structure is approximately 95% for a membrane design having these design parameters. The fill factors are calculated based on area A''' and A''' is selected such that the fill factor of a region of the deformable membrane would represent the value for the entire deformable membrane having first and second arrangements of structures.

During use, in for example, a force-sensing capacitor element which includes a deformable membrane according to the present disclosure, a force may applied to a first major surface, e.g. 110a, of a first layer, e.g. 110, of a deformable membrane, e.g. 100. The force is applied over a finite, nonzero area. The force applied uniformly over an area results in an applied uniaxial pressure (also referred to herein as compressive stress). The force compresses the deformable membrane 100, causing the total thickness $T_o$ to decrease. The force also urges first structures 142 into third layer 130 causing third layer 130 to deflect into some void regions 154, while second structures 152 provide support for third layer 130. In void regions 154 where third layer 130 has deflected, the distance $h_2$ between second major surface 130b and second major surface 120b is decreased. This change in distances of deformable membrane 100 may be a controlled dependence with respect to the applied force. In some embodiments, the change in distance $T_o$ of deformable membrane 100 in response to an applied force may be proportional to the applied force. The controlled dependence between applied force and the compression of the deformable membrane 100, i.e. the change in distance $T_o$, can be determined, for example, by experimental modeling, e.g. finite element modeling. As will be discussed in more detail, if appropriate electrodes are positioned upon or within the deformable membrane, forming a capacitor, the capacitance will change as the distance $T_o$ changes in response to the applied force.

Other layers can be included in the deformable membrane including adhesive layers. Adhesives useful in the deformable membranes and force-sensing capacitor elements of the present disclosure include, but are not limited to, pressure sensitive adhesive and cure in place adhesives. Cure in place adhesives include adhesive-solvent solutions where the final adhesive becomes tacky upon removal of solvent. Cure in place adhesives may be cured by application of radiation, including UV or visible light. Cure in place adhesives may be cured by application of heat, or stated differently elevated temperature (e.g., thermoset polymer). Cure in place adhesives may also be moisture cure adhesives. The adhesives may be used to laminate various layers/components of the deformable members and force-sensing capacitor elements together. Cure in place adhesives are preferred adhesives in the deformable membranes and force sensing capacitor elements of the present disclosure. The deformable member may be a single unitary structure, fabricated for example, by conventional polymer injection molding techniques. The first, second and/or third layers of the deformable membrane may be laminated to the corresponding first structures of the first arrangement and/or second structures of the second arrangement through the use of appropriate adhesive layers. Some or all of the adhesive layers may be the same, i.e. the same chemical composition. All of the adhesive layers may be different, i.e. all have different chemical compositions.

Embodiments of the deformable membranes or force-sensing capacitor elements, wherein one or more layers are attached to one or more structures, are not limited by any particular means of adhering, bonding, or fusing of the attached materials. The first arrangement and/or second arrangement may be formed directly on the corresponding first, second and/or third layers. The adhesives may be used to laminate or adhere any of the electrodes to the desired major surface of the first layer, second layer and/or third layer. As an alternative to adhesive bonding, the layers and structures of the deformable membranes, electrodes, capacitors, and capacitive sensing elements of the present disclosure may be fused by application of heat.

The deformable membranes of the present disclosure are particularly suited for use in force-sensing capacitor elements and any of the previously described deformable membrane embodiments may be used in any of the force-sensing capacitor element embodiments described herein. In order to fabricate a force-sensing capacitor element with the deformable membranes of the present disclosure, electrodes, e.g. electrode pairs, need to be incorporated with the deformable membranes. The deformable membranes or parts thereof may function as the dielectric of the force sensing capacitor elements. The positions of the electrodes with respect to the deformable membrane structure coincide with the deformable regions of the deformable membrane. Capacitance of one or more of the individual capacitors will change as the deformable membrane compresses in response to an applied force on the first surface of the first layer. As the magnitude of this applied force will correlate with the magnitude of the dimensional changes of the deformable membrane and the magnitude of the dimensional changes of the deformable membrane will cause corresponding changes in the capacitance, a force-sensing capacitor element may be obtained. A force-sensing capacitor element according to the present disclosure may include more than one capacitor, for example an arrangement or an array of capacitors, thus allowing for measuring the force (or stated differently, pressure) distribution across the force-sensing capacitor element (i.e., positional measurement of force or pressure).

The capacitance of the capacitor, and the change in capacitance with compression, can be measured using any of a variety of known drive electronics. As used herein, the term measure, as related to the capacitance or change in capacitance of a capacitor, may include estimation of the capacitance, as may be expressed in farads. Alternatively, as used herein, the term measure, as related to the capacitance or change in capacitance of a capacitor, may include indirect determination of the magnitude of capacitance of the capacitor through the behavior of that capacitor in a circuit (or, alternatively, the behavior of a circuit that includes the capacitor). The attachment of a capacitor of the present disclosure to a circuit that measures the capacitance is also described herein as attachment of the capacitor to drive electronics that measure the capacitance. Examples of known capacitance measurement circuits are reported in, for example, U.S. Publ. Patent Application Nos. 2010/073323 (Geaghan), 2008/142281 (Geaghan), 2009/167325 (Geaghan), and 2011/115717 (Hable, et. al.), all incorporated herein in their entirety, by reference. The capacitance and the change in capacitance with compression are indirect measures of the force (or stated alternatively, the pressure) applied to the capacitor. In general, the applied force or applied pressure changes the shape of the capacitor due to strain of a material or materials of construction of the capacitor. The change in shape of the capacitor results in a change in capacitance. A capacitive sensing element, i.e. a force-sensing capacitor element, according to the present disclosure may include more than one capacitor, for example an array of capacitors, thus allowing for measuring the force (or stated differently, pressure) distribution across the sensing element (i.e., positional measurement of force or pressure). A capacitive sensing element according to the present disclosure may include spaced apart row and column electrodes (as shown in, for example, FIG. 2 of U.S. Publ. Patent Application No. 2013082970 (Frey, et, al.) incorporated herein in its entirety, by reference), the capacitance between which can be determined according to known methods of mutual capacitance detection, thus allowing for positionally measuring the force (or stated differently, pressure) distribution across the sensing element (i.e., positional measurement of force or pressure). In some embodiments, the aforementioned row electrodes may be embedded within or proximate to or in contact with the first major surface or second major surface of the first layer, and the aforementioned column electrodes may be embedded within or proximate to or in contact with the first major surface or the second major surface of the second layer.

In some embodiments, a force-sensing capacitor element according to the present disclosure may include a deformable membrane according to any one of the previous described deformable membranes, at least one first electrode embedded within the first layer or proximate to or in contact with one of the first major surface and the second major surface of the first layer; and at least one second electrode embedded within the second layer or proximate to or in contact with one of the first major surface and the second major surface of the second layer. A voltage may be applied between the first and second electrodes. The applied voltage induces an electrical charge on the first electrode that is opposite that of the electrical charge on the second electrode. The dimensions of the first and second electrodes are not particularly limited. Their lengths and/or widths may be of similar dimensions as the dimensions of at least one of the first major surfaces of the first and second layer of the deformable membrane. At least one of the first and second electrodes may be planar electrodes. The first and second electrodes may have one or more electrical leads, providing a means of electrical connection to other electrical components and/or devices. In some embodiments, the at least one first electrode includes a plurality of first electrodes. In other embodiments, the at least one second electrode includes a plurality of second electrodes. In yet other embodiments, the at least one first electrode includes a plurality of first electrodes and the at least one second electrode includes a plurality of second electrodes. Throughout this disclosure, if an electrode is said to be "embedded" in a layer, it can be fully embedded, i.e. fully enclosed by the layer or it can be partially embedded, i.e. part of the electrode may be protruding above a major surface of the layer. Throughout this disclosure, if an electrode is said to be proximate to a major surface of a layer, the electrode may be in contact with the major surface of the layer or one or more additional layers may be interposed between the electrode and the major surface of the layer, with the electrode in contact with the surface of the adjacent additional layer. Several specific, but non-limiting, embodiments are shown in FIGS. 4A and 4B.

Figure 4A:
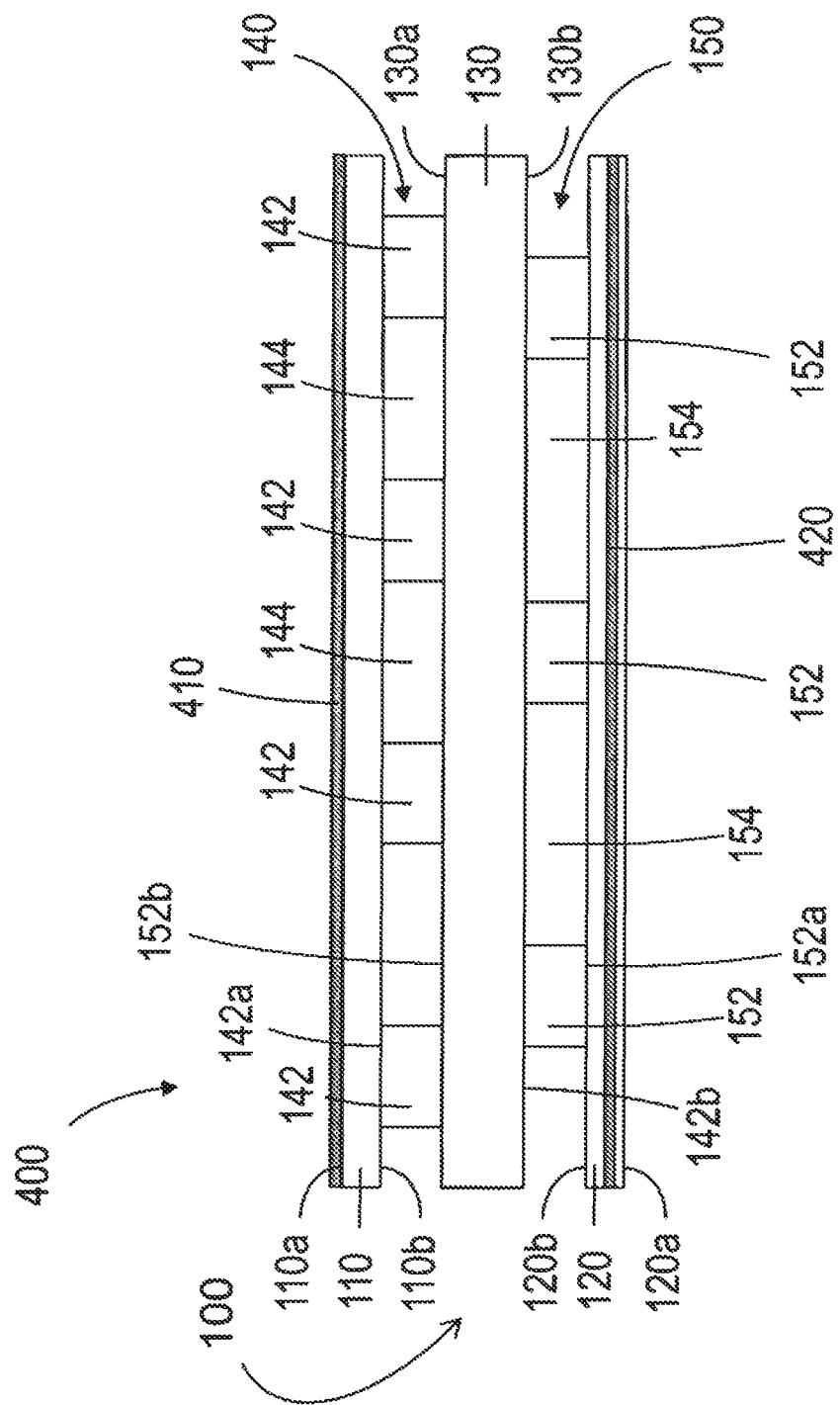
FIG. 4A is a schematic cross-sectional side view of an exemplary force-sensing capacitor element according to one exemplary embodiment of the present disclosure.
Figure 4B:
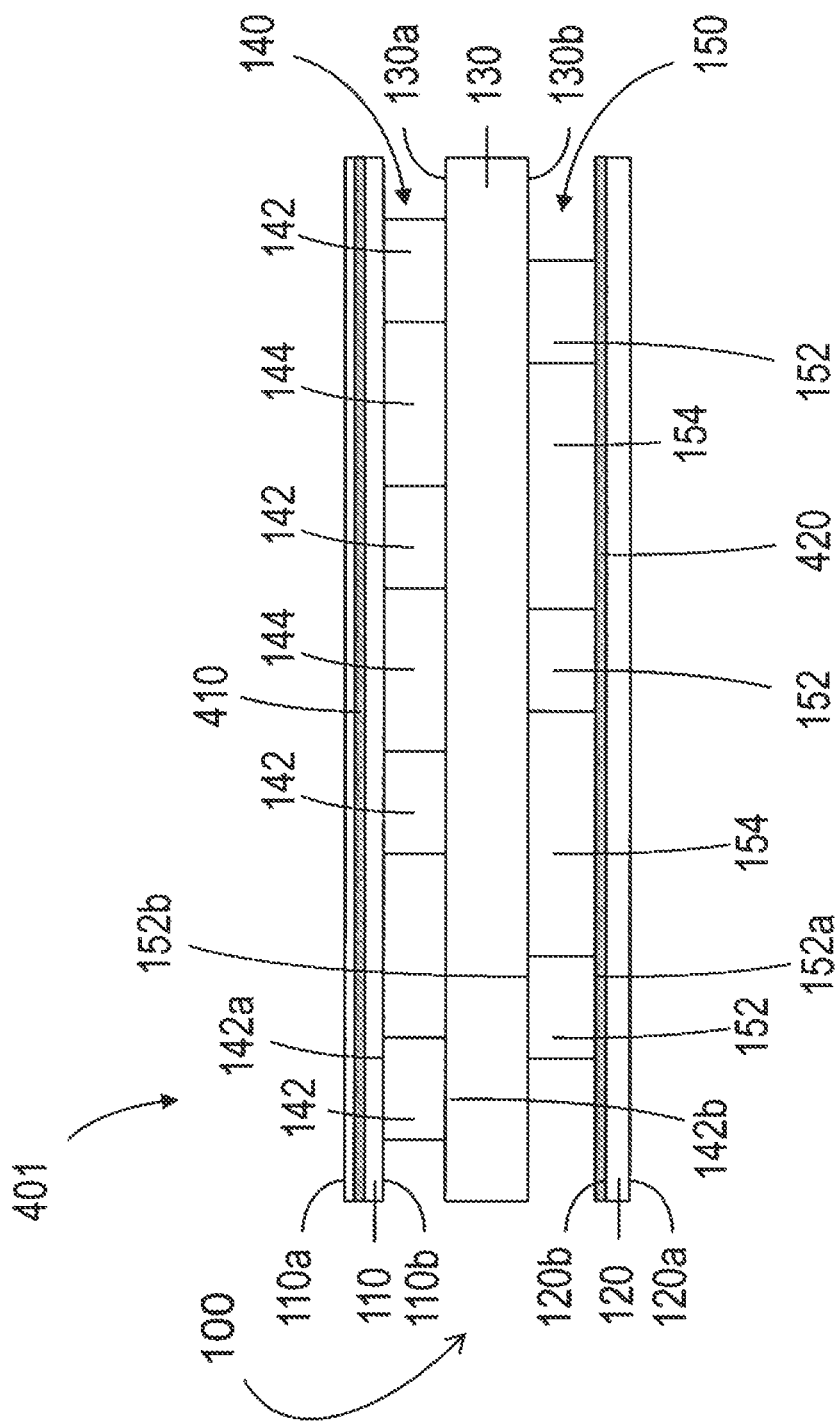
FIG. 4B is a schematic cross-sectional side view of an exemplary force-sensing capacitor element according to one exemplary embodiment of the present disclosure.

Referring now to FIG. 4A, force-sensing capacitor element 400 includes deformable membrane 100, as previously described, first electrode 410 proximate to or in contact with the first major surface 110a of first layer 110 and second electrode 420 embedded within the second layer 120. Referring now to FIG. 4B, force-sensing capacitor element 401 includes deformable membrane 100, as previously described, first electrode 410 embedded within the first layer 110 and second electrode 420 proximate to or in contact with the second major surface 120b of second layer 120. The force-sensing capacitor elements, of FIGS. 4A and 4B may represent a portion of a force-sensing capacitor element that spans further in length (lateral dimension). The at least one first electrode and the at least one second electrode may each be a single electrode that spans, for example, greater than 20%, greater than 30%, greater than 40%, greater than 50%, greater than 60%, greater than 70%, greater than 80%, greater than 90% or even greater than 95% of at least one of the length (lateral dimension) and width (dimension into the page) of the force-sensing capacitor element. In some embodiments, the at least one first electrode and the at least one second electrode may each be a single electrode that spans, for example, greater than 20%, greater than 30%, greater than 40%, greater than 50%, greater than 60%, greater than 70%, greater than 80%, greater than 90% or even greater than 95% of both the length (lateral dimension) and width (dimension into the page) of the force-sensing capacitor element. In some embodiments, at least one of the first electrode and the at least one second electrode span the entire length of the force sensing capacitor element. In another embodiment, both the at least one first electrode and the at least one second electrode span the entire length of the force-sensing capacitor element. In another embodiment, the force sensing-capacitor element includes one first electrode and one second electrode. In another embodiment, the at least one first electrode spans greater than 60%, greater than 70%, greater than 80%, greater than 90% or even greater than 95% of the length of the force-sensing capacitor element and the at least one second electrode spans greater than 60%, greater than 70%, greater than 80%, greater than 90% or even greater than 95% of the width of the force-sensing capacitor element. In another embodiment, the at least one first electrode spans greater than 60%, greater than 70%, greater than 80%, greater than 90% or even greater than 95% of the width of the force-sensing capacitor element and the at least one second electrode spans greater than 60%, greater than 70%, greater than 80%, greater than 90% or even greater than 95% of the length of the force-sensing capacitor element. In yet another embodiment, the force-sensing capacitor element includes one first electrode and a plurality of second electrodes. In another embodiment, the force-sensing capacitor element includes a plurality of first electrodes and one second electrode. In yet another embodiment, the force-sensing capacitor includes a plurality of first electrodes and a plurality of second electrodes. When required, one or more electrical leads may be included to provide electrical communication between the at least one first electrode to other electrical components and/or devices and one or more electrical leads may be included to provide electrical communication between the at least one second electrode to other electrical components and/or devices.

The positioning of the electrodes in the force-sensing capacitor element may be selected based on the design of the deformable membrane and the design criteria of the force-sensing capacitor elements. One of skill in the art will recognize that there may be many possible combinations of electrode configurations that may be useful in the force-sensing capacitor elements of the present disclosure. Representative, non-limiting, embodiments are further disclosed in FIGS. 5A and 5B. Similar to FIGS. 3A through 3C, FIGS. 5A and 5B are schematic cross-sectional top views through an imaginary plane of arrangement 150 and include various components, including first structures and electrodes, as projections onto the plane. This provides images of how the various components of the force-sensing capacitor elements are arranged relative to one another within the imaginary plane.

Figure 5A:
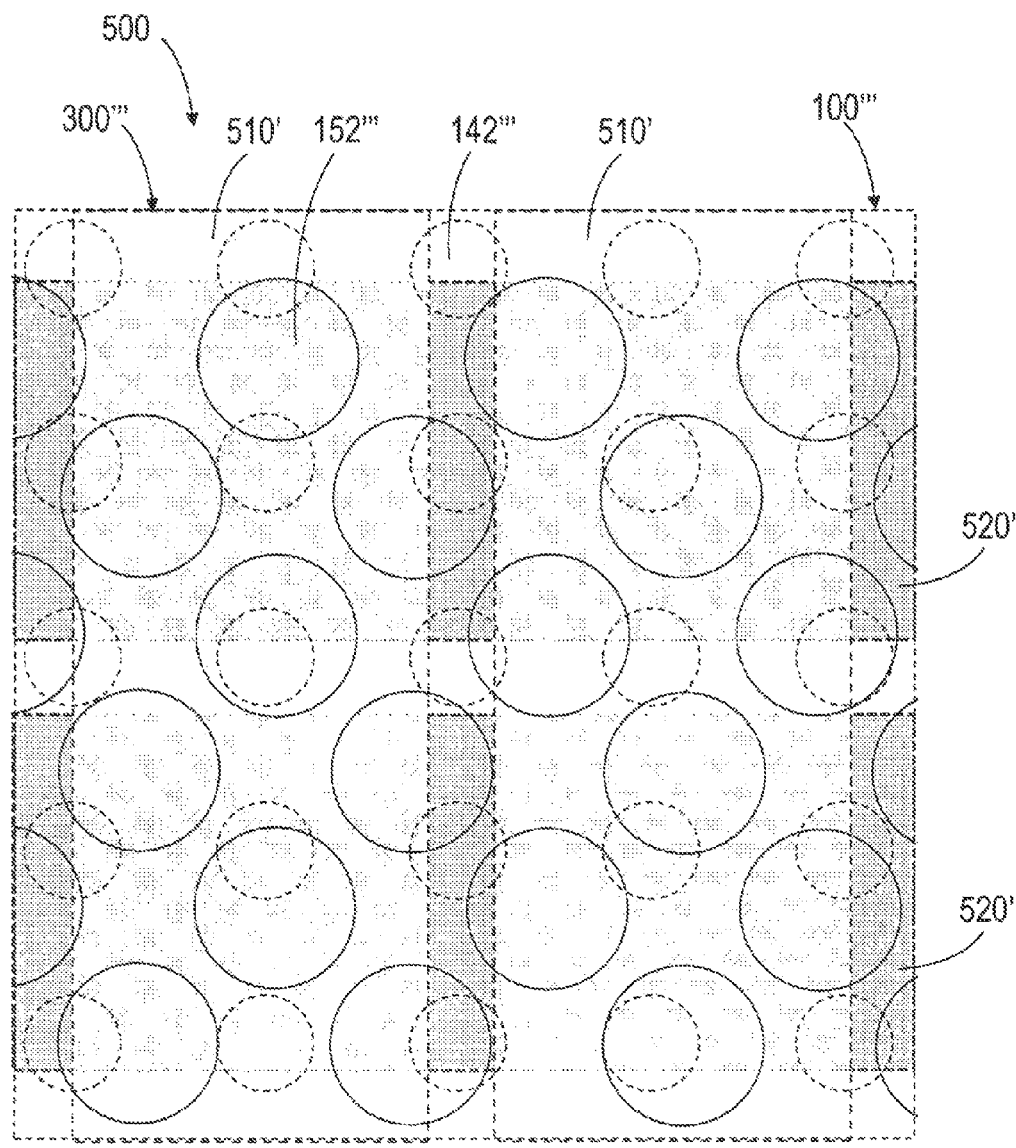
FIG. 5A is a schematic cross-sectional top view of an exemplary force-sensing capacitor element, through an imaginary plane of arrangement 150, according to one exemplary embodiment of the present disclosure.

In an exemplary embodiment of a force-sensing capacitor element, FIG. 5A shows a portion of an imaginary plane 500 which includes a portion of imaginary plane 300''', as previously described (FIG. 3C). FIG. 5A further includes projections of first electrodes 510' and projections of second electrodes 520'. The first electrodes may be embedded within the first layer or proximate to or in contact with one of the first major surface and the second major surface of the first layer of the deformable membrane, e.g. deformable membrane 100 shown in FIG. 1A. The second electrodes may be embedded within the second layer or proximate to or in contact with one of the first major surface and the second major surface of the second layer of the deformable membrane, e.g. deformable membrane 100 shown in FIG. 1A. The at least one first and at least one second electrodes may be lines or bars that span greater than 20%, greater than 30%, greater than 40%, greater than 50%, greater than 60%, greater than 70%, greater than 80%, greater than 90%, greater than 95% or even the entire of width of the deformable membrane or length of the deformable membrane. In some aspects, the at least one first electrodes may span the width of the deformable membrane and the at least one second electrodes may span the length of the deformable membrane. In other embodiments, the first and second electrodes may be discrete lines or pads with corresponding electrical leads that provide a means of electrical connection to other electrical components and/or devices. If electrical leads are required for the first and/or second electrodes, the location of the electrical leads may correspond with the location of the corresponding electrode in the first and second layer, e.g. if the first electrode is located on the first major surface of the first layer, the corresponding electrical lead would be located on the first major surface of the first layer.

Figure 5B:
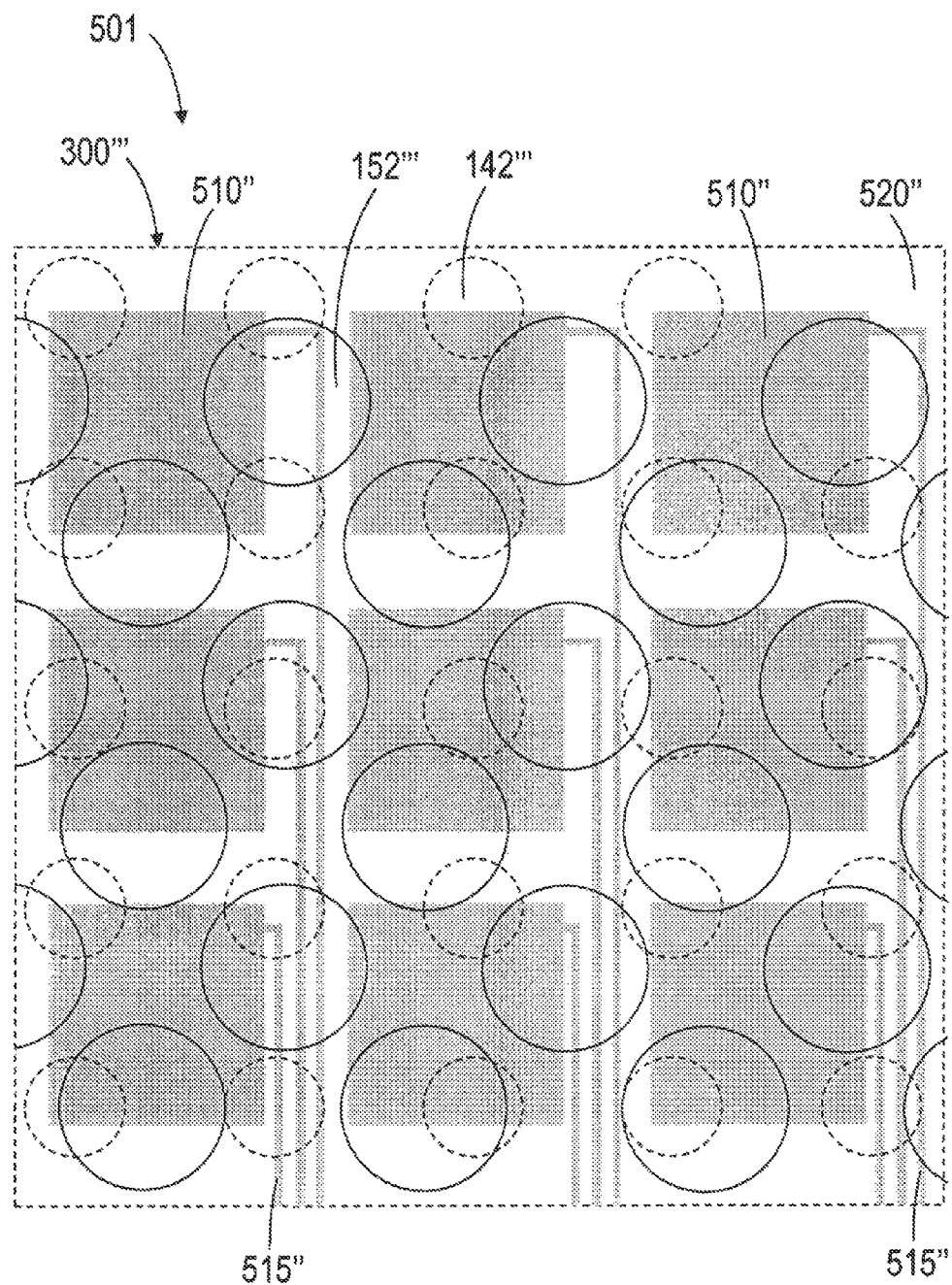
FIG. 5B is a schematic cross-sectional top view of an exemplary force-sensing capacitor element, through an imaginary plane of arrangement 150, according to one exemplary embodiment of the present disclosure.

In another exemplary embodiment of a force-sensing capacitor element, FIG. 5B shows a portion of an imaginary plane 501 which includes a portion of imaginary plane 300''', as previously describe (FIG. 3C). FIG. 5B further includes projections of a plurality of first electrodes 510'' with corresponding electrical leads 515'' and a projection of a second electrode 520''. In this embodiment, each of the plurality of electrodes is in the shape of a pad. The plurality of first electrodes and their corresponding electrical leads may be embedded within the first layer or proximate to or in contact with one of the first major surface and the second major surface of the first layer of the deformable membrane, e.g. deformable membrane 100 shown in FIG. 1A. Projection of second electrode 520'' indicates that the second electrode spans at least the entire area of the portion of plane 501 shown in FIG. 5B. The second electrode may span greater than 20%, greater than 30%, greater than 40%, greater than 50%, greater than 60%, greater than 70%, greater than 80%, greater than 90%, greater than 95% or even both the entire the length (lateral dimension) and width (dimension into the page) of the force-sensing capacitor element. In some embodiments, the second electrode may span greater than 20%, greater than 30%, greater than 40%, greater than 50%, greater than 60%, greater than 70%, greater than 80%, greater than 90% or even greater than 95% of at least one of the length and width of the force-sensing capacitor element. In some embodiments the second electrode spans the entire length and width of the force-sensing capacitor element. In another embodiment, a plurality of the second electrode may be used, wherein each second electrode has a major surface larger than the major surface of the first electrode (as shown by the projection 510'' and 520'' of FIG. 5B). In this embodiment, a plurality of second electrodes may be used with each second electrode having a corresponding electrical lead providing a means of electrical connection to other electrical components and/or devices. The at least one second electrode and any corresponding electrical lead may be embedded within the second layer or proximate to or in contact with one of the first major surface and the second major surface of the second layer of the deformable membrane, e.g. deformable membrane 100 shown in FIG. 1A.

In another embodiment, a force-sensing capacitor element according to the present disclosure may include a deformable membrane according to any of the previously described deformable membranes, at least one first electrode and at least one second electrode forming at least one electrode pair embedded within the first layer or proximate to or in contact with at least one of the first and the second major surfaces of the first layer or embedded within the second layer or proximate to or in contact with at least one of the first and the second major surfaces of the second layer, wherein each of the at least one first electrode and the at least one second electrode are separated by a gap. When more than one electrode pair is present, the gap between the at least one first electrode and the at least one second electrode may be constant for all electrode pairs or may vary for one or more electrode pairs. In some embodiments, the at least one electrode pair is embedded only within the first layer or proximate to or in contact with at least one of the first and the second major surfaces of the first layer and, optionally, the force-sensing capacitor element may include a third electrode, wherein the third electrode is embedded within the second layer or proximate to or in contact with at least one of the first and the second major surfaces of the second layer and the third electrode overlaps with the at least one first electrode and the at least one second electrode through the thickness of the force-sensing capacitor element. In other embodiments, the at least one electrode pair is embedded only within the second layer or proximate to or in contact with at least one of the first and the second major surfaces of the second layer and, optionally, the force-sensing capacitor element may include a third electrode, wherein the third electrode is embedded within the first layer or proximate to or in contact with at least one of the first and the second major surfaces of the first layer and the third electrode overlaps with the at least one first electrode and the at least one second electrode through the thickness of the force-sensing capacitor element. Throughout this disclosure, the thickness of the force-sensing capacitor element coincides with the thickness of the deformable member.

The force-sensing capacitor element may include a single capacitor or a plurality of capacitors. A voltage may be applied between the first and second electrodes. The voltage induces an electrical charge on the first electrode that is opposite that of the electrical charge on the second electrode. The size and shape of the first and second electrodes and the gap are not particularly limited, except that the gap must be small enough for the electrode pair to act as a capacitor. The at least one first and at the least one second electrodes may be planar electrodes. The at least one first electrode and the at least one second electrode may have one or more corresponding electrical leads, providing a means of electrical connection to other electrical components and/or devices.

The first and second electrodes of the electrode pairs, each pair defining a capacitor, can be electrically connected to a circuit that measures the capacitance, also described herein as being electrically connected or attached to drive electronics that measure the capacitance. Several specific, but non-limiting, embodiments are shown in FIG. 6A, FIG. 6B and FIG. 7.

Referring now to FIG. 6A, force-sensing capacitor element 600 includes deformable membrane 100, as previously described, an electrode pair, including first electrodes 610p and second electrodes 610n separated by gap proximate to or in contact with the second major surface 120b of second layer 120. In other embodiments the at least one first electrode and the at least one second electrode forming at least one electrode pair may be embedded in the second layer or may be proximate to or in contact with the first major surface of the second layer. In some embodiments, the at least one first electrode includes a plurality of first electrodes. In some embodiments, the at least one second electrode includes a plurality of second electrodes. In yet other embodiments, the at least one first electrode includes a plurality of first electrodes and the at least one second electrode includes a plurality of second electrodes. In another embodiment, one second electrode is the electrode pair for a plurality of first electrodes. In yet another embodiment, one first electrode is the electrode pair for a plurality of second electrodes.

Figure 6B:
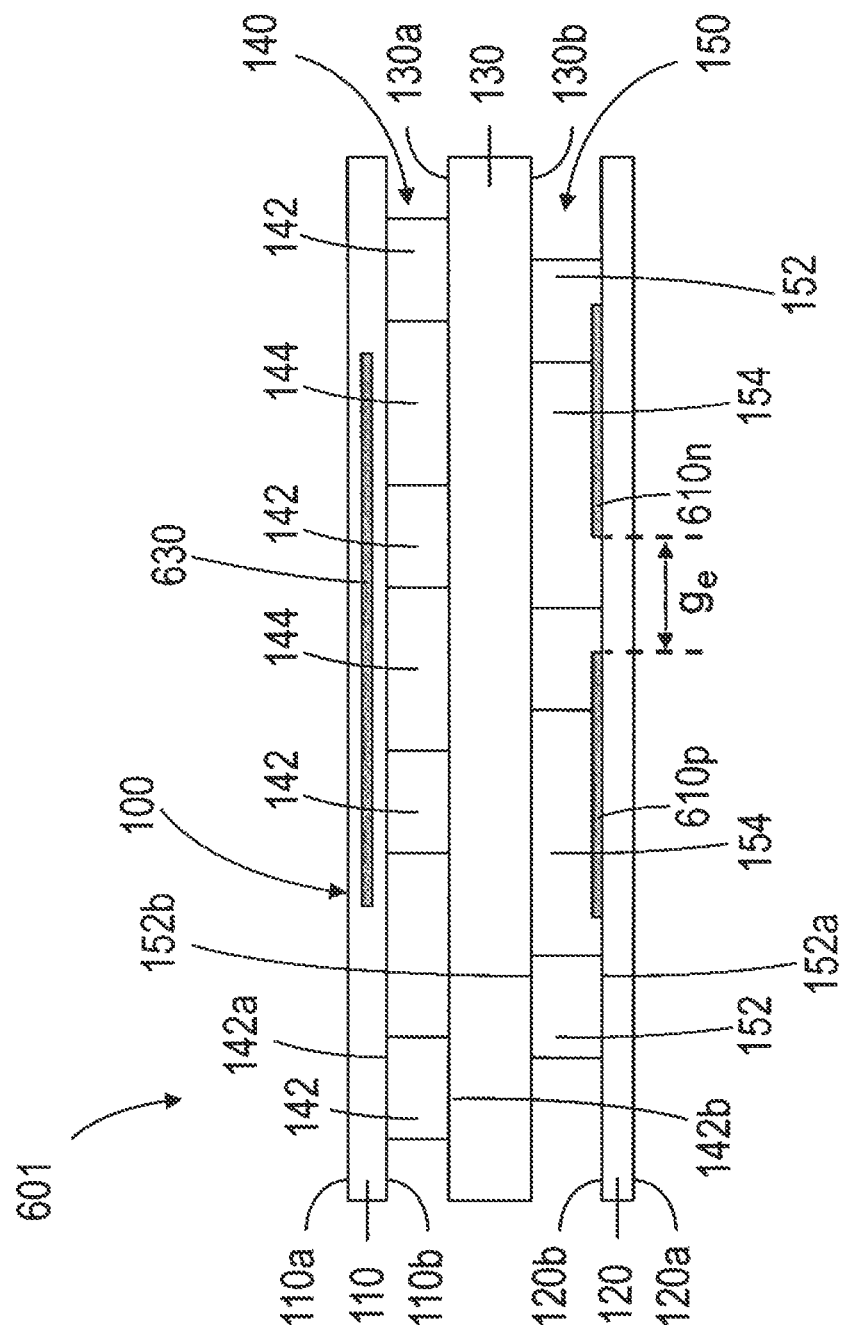
FIG. 6B is a schematic cross-sectional side view of an exemplary force-sensing capacitor element according to one exemplary embodiment of the present disclosure.
Figure 7:
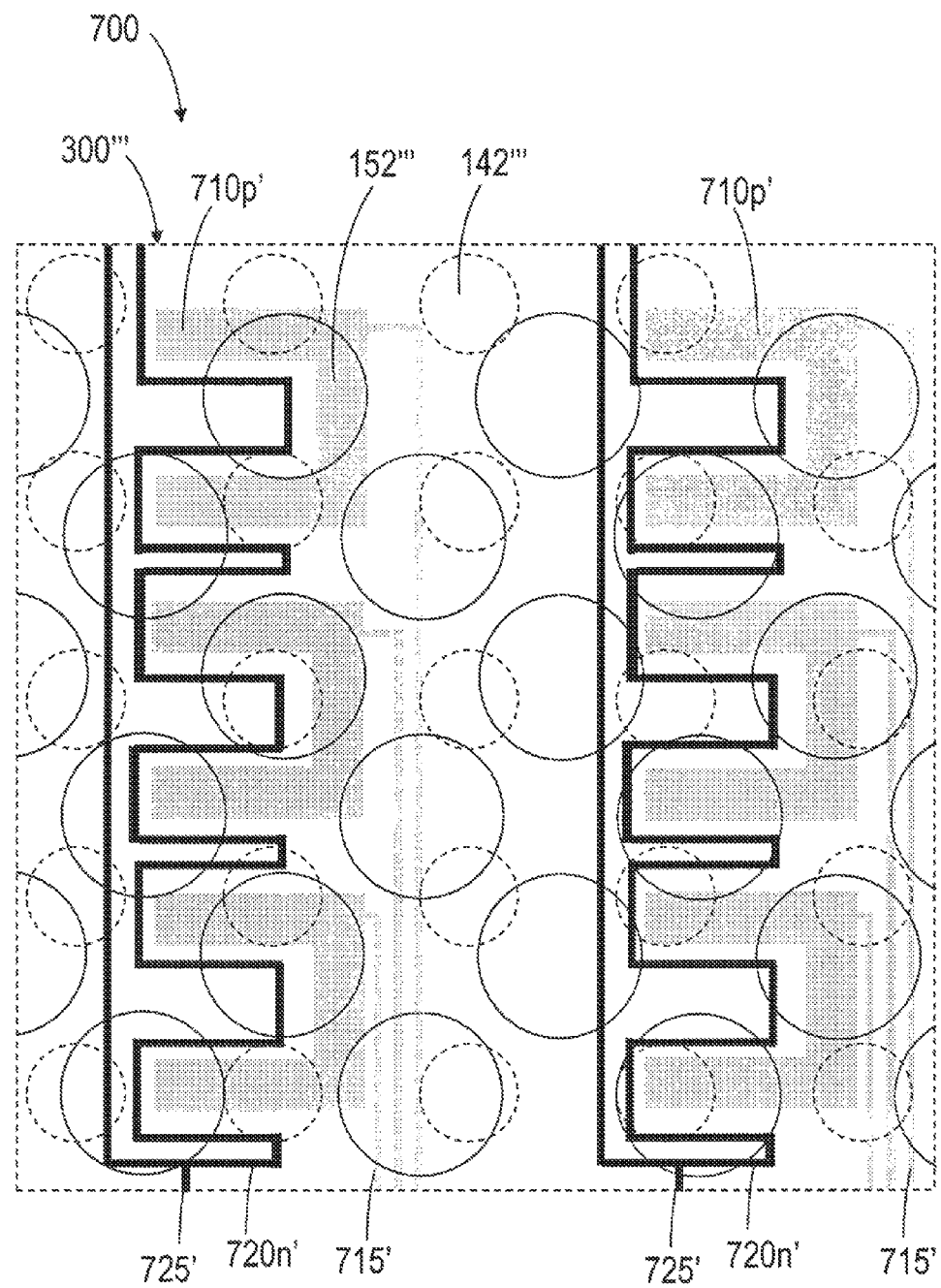
FIG. 7 is a schematic cross-sectional top view of an exemplary force sensing capacitor element, through an imaginary plane of arrangement 150, according to one exemplary embodiment of the present disclosure.

Referring now to FIG. 6B, force-sensing capacitor element 601 includes the force-sensing capacitor element of FIG. 6A and further includes optional third electrode 630 embedded within first layer 110.

The force-sensing capacitor elements of FIGS. 6A and 6B may represent a portion of a force-sensing capacitor element that spans further in length (lateral dimension).

In yet another exemplary embodiment of a fierce sensing capacitor element, FIG. 7 shows a portion of an imaginary plane 700 which includes a portion of imaginary plane 300''', as previously describe (FIG. 3C). FIG. 7 further includes projections of a plurality of first electrodes 710p' with the corresponding projection of electrical leads 715' and a projection of a plurality of second electrodes 720n' with the corresponding projection of electrical leads 725'. Adjacent first electrodes 710p (not shown, depicted as projections 710p') and second electrodes 720n (not shown, depicted as projections 720n'), form electrode pairs. The plurality first electrodes 710p and their corresponding electrical leads 715 (not shown, depicted by projections 715') and the plurality of second electrodes 720n and their corresponding electrical leads 725 (not shown, depicted by projections 725') may be embedded within the second layer or proximate to or in contact with one of the first major surface and the second major surface of the second layer of the deformable membrane, e.g. deformable membrane 100 shown in FIG. 1A. In the embodiment of FIG. 7, second electrode 720n serves as a counter electrode for a plurality of first electrodes 710p, defining electrode pairs 720n and 710p. In other embodiments, first electrode 710p may serve as a counter electrode for a plurality of second electrodes 720n, defining electrode pairs 710p and 720n.

Projection of second electrode 720n' indicates that the second electrode spans nearly the entire width (vertical direction) of the portion of plane 700 shown in FIG. 7. In some embodiments, the second electrode may span greater than 20%, greater than 30%, greater than 40%, greater than 50%, greater than 60%, greater than 70%, greater than 80%, greater than 90%, greater than 95% or even 100% of at least one of the length (lateral dimension) and width (vertical dimension) of the force sensing capacitor element.

In any of the previously described embodiments of force-sensing capacitor elements, wherein the force sensing capacitor element includes at least one first electrode and at least one second electrode, the force-sensing capacitor element may further include capacitance measurement circuitry, wherein the at least one first electrode and the at least one second electrode are connected to capacitance measurement circuitry and the capacitance measurement circuitry is configured to measure the capacitance between the at least one first electrode and the at least one second electrode. In any of the previously described embodiments of force-sensing capacitor elements, wherein the force sensing capacitor element includes at least one first electrode, at least one second electrode and a third electrode, the force-sensing capacitor element may further include capacitance measurement circuitry, wherein the at least one first electrode, the at least one second electrode, and the third electrode are connected to the capacitance measurement circuitry and the capacitance measurement circuitry is configured to measure the capacitance between the at least one first electrode and the third electrode and the capacitance between the at least one second electrode and the third electrode.

Electrodes used in the force-sensing capacitor elements of the present disclosure may be metals or metal alloys, including but not limited to, indium-tin-oxide, aluminum, copper, silver and gold. The electrodes used in the force-sensing capacitor elements of the present disclosure may be electrically conductive composites containing one or more conductive particles, fibers, woven or non-woven mats and the like. The conductive particles, fibers, woven or non-woven mats may include the above metal. They also may be non-conductive particles, fibers, woven or non-woven mats that have been coated with a conductive material, e.g. a metal, including but not limited to, aluminum, copper, silver and gold. The electrodes used in the force-sensing capacitor elements may be in the form of thin films, e.g. a thin metal film or thin electrically conductive composite film. The thickness of the electrodes may be between about 0.1 microns and about 200 microns. The thickness may be greater than about 0.5 microns, greater than about 1 microns, greater than about 2 microns, greater than about 3 microns, greater than about 4 microns or even greater than about 5 microns; less than about 50, less than about 40 microns, less than about 30 microns, less than about 20 microns, or even less than 10 microns. The electrodes may be fabricated by know techniques in the art including, but not limited to, techniques commonly used to form indium-tin-oxide traces in present touch screen displays and techniques commonly used to form metal lines and vias in semiconductor manufacturing. Other useful techniques for fabricating the electrodes include screen printing, flexographic printing, inkjet printing, photolithography, etching, and lift-off processing. In embodiments where at least one electrode is embedded within at least one of the first, second and third layers, one or more vias and corresponding metal interconnects, e.g. conductive lines on the surface of a layer, may be used to facilitate electrical contact to the electrode(s).

The force-sensing capacitor elements of the present disclosure may be useful in various electronic devices. Electronic devices include (1) personal computers, (2) displays and monitors, (3) tablets or slate type computing devices, (4) personal electronic and or communication devices, such as for example, smart phones, digital music players and (5) any personal device whose function includes creating, storing or consuming digital media. In another embodiment, an electronic device comprises a force-sensing capacitor element or any of the proceeding embodiments. In yet another embodiment, a touch screen display comprises a force-sensing capacitor element of any of the proceeding embodiments.

The deformable membranes and force-sensing capacitor elements of the present disclosure can be fabricated by a variety of techniques through a variety of process sequences that may include steps known in the art.

In some embodiments, the deformable membrane may be formed "in-situ" during the fabrication of the force-sensing capacitor element.

In one embodiment for a method of making a force-sensing capacitor element, a first arrangement of a plurality of first structures having first and second surfaces, with corresponding first void regions, may be formed on a first major surface of a third layer; and a second arrangement of a plurality of second structures having first and second surfaces, with corresponding second void regions, may be formed on a second major surface of the third layer, wherein the second surfaces of the plurality of first structures face the first major surface of the third layer and the second surfaces of the plurality of second structures face the second major surface of the third layer. A first layer is provided, wherein the first layer includes at least one first electrode embedded within the first layer or proximate to or in contact with one of the first major surface and the second major surface of the first layer. The first layer is bonded to at least a portion of the first surfaces of the plurality of first structures, such that the second major surface of the first layer faces the first surfaces of the first structures. A second layer is provided, wherein the second layer includes at least one second electrode embedded within the first layer or proximate to or in contact with one of the first major surface and the second major surface of the second layer. The second layer is bonded to at least a portion of the first surfaces of the plurality of second structures, such that the second major surface of the second layer faces the first surfaces of the first structures. In some embodiments i) from about 1% to about 99%, from about 2% to about 95%, from about 5% to about 90%, or even from about 10% to about 50% of the plurality of first structures have first surfaces that each overlap through the thickness of the deformable membrane with one or more of the first surfaces or with one or more of the second surfaces of the plurality of second structures, or ii) from about 1% to about 99%, from about 2% to about 95%, from about 5% to about 90%, or even from about 10% to about 50% of the plurality of first structures have second surfaces that each overlap through the thickness of the deformable membrane with one or more of the first surfaces or with one or more of the second surfaces of the plurality of second structures.

In another embodiment for a method of making a force-sensing capacitor element, a first arrangement of a plurality of first structures having first and second surfaces, with corresponding first void regions, may be formed on a first major surface of a third layer; and a second arrangement of a plurality or second structures having first and second surfaces, with corresponding second void regions, may be formed on a second major surface of the third layer, wherein the second surfaces of the plurality of first structures face the first major surface of the third layer and the second surfaces of the plurality of second structures face the second major surface of the third layer. A first layer is provided, wherein the first layer includes at least one first electrode and at least one second electrode forming at least one electrode pair embedded within the first layer or proximate to or in contact with at least one of the first and the second major surfaces of the first layer. The first layer is bonded to at least a portion of the first surfaces of the plurality of first structures, such that the second major surface of the first layer faces the first surfaces of the first structures. A second layer is provided having a first major surface and second major surface. The second layer is bonded to at least a portion of the first surfaces of the plurality of second structures, such that the second major surface of the second layer faces the first surfaces of the second structures. In some embodiments i) from about to about 99%, from about 2% to about 95%, from about 5% to about 90%, or even from about 10% to about 50% of the plurality of first structures have first surfaces that each overlap through the thickness of the deformable membrane with one or more of the first surfaces or with one or more of the second surfaces of the plurality of second structures, or ii) from about 1% to about 99%, from about 2% to about 95%, from about 5% to about 90%, or even from about 10% to about 50% of the plurality of first structures have second surfaces that each overlap through the thickness of the deformable membrane with one or more of the first surfaces or with one or more of the second surfaces of the plurality of second structures. In some embodiments the second layer may include a third electrode. The third electrode may be embedded within the second layer or proximate to or in contact with at least one of the first and the second major surfaces of the second layer and the third electrode overlaps with the at least one first electrode and the at least one second electrode through the thickness of the force-sensing capacitor element.

In one embodiment for a method of making a for capacitor element, a first layer is provided, wherein the first layer includes at least one first electrode embedded within the first layer or proximate to or in contact with one or the first major surface and the second major surface of the first layer, and a second layer is provided, wherein the second layer includes at least one second electrode embedded within the first layer or proximate to or in contact with one of the first major surface and the second major surface of the second layer. A first arrangement of a plurality of first structures having first and second surfaces, with corresponding first void regions, is formed on the first layer, wherein the first surfaces of the plurality of first structures face the second major surface of the first layer. A second arrangement of a plurality of second structures having first and second surfaces, with corresponding second void regions, is formed on the second layer, wherein the first surfaces of the plurality of second structures face the second major surface of the second. A third layer having first and second major surfaces is provided and the first major surface of the third layer is bonded to at least a portion of the second surfaces of the plurality of first structures and the second major surface of the third layer is bonded to at least a portion of the second surfaces of the plurality of second structures. In some embodiments i) from about 1% to about 99%, from about 2% to about 95%, from about 5% to about 90%, or even from about 10% to about 50% of the plurality of first structures have first surfaces that each overlap through the thickness of the deformable membrane with one or more of the first surfaces or with one or more of the second surfaces of the plurality of second structures, or ii) from about 1% to about 99%, from about 2% to about 95%, from about 5% to about 90%, or even from about 10% to about 50% of the plurality of first structures have second surfaces that each overlap through the thickness of the deformable membrane with one or more of the first surfaces or with one or more of the second surfaces of the plurality of second structures.

In another embodiment for a method of making a force-sensing capacitor element, a first layer is provided, wherein the first layer includes at least one first electrode and at least one second electrode forming at least one electrode pair embedded within the first layer or proximate to or in contact with at least one of the first and the second major surfaces of the first layer. A second layer is provided, wherein the second layer includes a first major surface and a second major surface. A first arrangement of a plurality of first structures having first and second surfaces, with corresponding first void regions, is formed on the first layer, wherein the first surfaces of the plurality of first structures face the second major surface of the first layer. A second arrangement of a plurality of second structures having first and second surfaces, with corresponding second void regions, is formed on the second layer, wherein the first surfaces of the plurality of second structures face the second major surface of the second layer. A third layer having first and second major surfaces is provided and the first major surface of the third layer is bonded to at least a portion of the second surfaces of the plurality of first structures and the second major surface of the third layer is bonded to at least a portion of the second surfaces of the plurality of second structures. In some embodiments i) from about 1% to about 99%, from about 2% to about 95%, from about 5% to about 90%, or even from about 10% to about 50% of the plurality of first structures have first surfaces that each overlap through the thickness of the deformable membrane one or more of the first surfaces or with one or more of the second surfaces of the plurality of second structures, or ii) from about 1% to about 99%, from about 2% to about 95%, from about 5% to about 90%, or even from about 10% to about 50% of the plurality of first structures have second surfaces that each overlap through the thickness of the deformable membrane with one or more of the first surfaces or with one or more of the second surfaces of the plurality of second structures. In some embodiments the second layer may include a third electrode. The third electrode may be embedded within the second layer or proximate to or in contact with at least one of the first and the second major surfaces of the second layer and the third electrode overlaps with the at least one first electrode and the at least one second electrode through the thickness of the force-sensing capacitor element.

In one embodiment for a method of making a force-sensing capacitor element, a first arrangement of a plurality of first structures having first and second surfaces, with corresponding first void regions, may be formed on a first major surface of a third layer, wherein the second surfaces of the plurality of first structures face the first major surface of the third layer. A first layer is provided, wherein the first layer includes at least one first electrode embedded within the first layer or proximate to or in contact with one of the first major surface and the second major surface of the first layer. A second layer is provided, wherein the second layer includes at least one second electrode embedded within the first layer or proximate to or in contact with one of the first major surface and the second major surface of the second layer. A second arrangement of a plurality of second structures having first and second surfaces, with corresponding second void regions, may be formed on a second major surface of the second layer, wherein the first surfaces of the plurality of second structures face the second major surface of the second layer. The first layer is bonded to at least a portion of the first surfaces of the plurality of first structures, wherein the second major surface of the first layer faces the first surfaces of the first structures. The third layer is bonded to at least a portion of the second surfaces of the plurality of second structures wherein the second major surface of the third layer faces the second major surface of the second structures. In some embodiments i) from about 1% to about 99%, from about 2% to about 95%, from about 5% to about 90%, or even from about 10% to about 50% of the plurality of first structures have first surfaces that each overlap through the thickness of the deformable membrane with one or more of the first surfaces or with one or more of the second surfaces of the plurality of second structures, or ii) from about 1% to about 99%, from about 2% to about 95%, from about 5% to about 90%, or even from about 10% to about 50% of the plurality of first structures have second surfaces that each overlap through the thickness of the deformable membrane with one or more of the first surfaces or with one or more of the second surfaces of the plurality of second structures.

In another embodiment for a method of making a force-sensing capacitor element, a first arrangement of a plurality of first structures having first and second surfaces, with corresponding first void regions, may be formed on a first major surface of a third layer, wherein the second surfaces of the plurality of first structures face the first major surface of the third layer. A first layer is provided, wherein the first layer includes at least one first electrode and at least one second electrode forming at least one electrode pair embedded within the first layer or proximate to or in contact with at least one of the first and the second major surfaces of the first layer. A second layer is provided, wherein, the second layer includes a first major surface and a second major surface. A second arrangement of a plurality of second structures having first and second surfaces, with corresponding second void regions, may be formed on a second major surface of the second layer, wherein the first surfaces of the plurality of second structures face the second major surface of the second layer. The first layer is bonded to at least a portion of the first surfaces of the plurality of first structures, wherein the second major surface of the first layer faces the first major surfaces of the first structures. The third layer is bonded to at least a portion of the second surfaces of the plurality of second structures such that the second major surface of the third layer faces the second major surfaces of the second structures. In some embodiments i) from about 1% to about 99%, from about 2% to about 95%, from about 5% to about 90%, or even from about 10% to about 50% of the plurality of first structures have first surfaces that each overlap through the thickness of the deformable membrane with one or more of the first surfaces or with one or more of the second surfaces of the plurality of second structures, or ii) from about 1% to about 99%, from about 2% to about 95%, from about 5% to about 90%, or even from about 10% to about 50% of the plurality of first structures have second surfaces that each overlap through the thickness of the deformable membrane with one or more of the first surfaces or with one or more of the second surfaces of the plurality of second structures. In some embodiments the second layer may include a third electrode. The third electrode may be embedded within the second layer or proximate to or in contact with at least one of the first and the second major surfaces of the second layer and the third electrode overlaps with the at least one first electrode and the at least one second electrode through the thickness of the force-sensing capacitor element.

In yet another embodiment for a method of making a force-sensing capacitor element, a first layer is provided, wherein the first layer includes at least one first electrode and at least one second electrode forming at least one electrode pair embedded within the first layer or proximate to or in contact with at least one of the first and the second major surfaces of the first layer. A first arrangement of a plurality of first structures having first and second surfaces, with corresponding first void regions, may be formed on a second major surface of the first layer, wherein the first surfaces of the plurality of first structures face the second major surface of the first layer. A second layer is provided, wherein the second layer includes a first major surface and a second major surface. A third layer is provided, wherein the third layer includes a first major surface and a second major surface. A second arrangement of a plurality of second structures having first and second surfaces, with corresponding second void regions, may be formed on a second major surface of the third layer, wherein the second surfaces of the plurality of second structures face the second major surface of the third layer. The third layer is bonded to at least a portion of the first surfaces of the plurality of first structures, wherein the second major surface of the first layer faces the first major surfaces of the first structures. The second layer is bonded to at least a portion of the first surfaces of the plurality of second structures such that second major surface of the second layer faces the first major surfaces of the second structures. In some embodiments i) from about 1% to about 99%, from about 2% to about 95%, from about 5% to about 90%, or even from about 10% to about 50% of the plurality of first structures have first surfaces that each overlap through the thickness of the deformable membrane with one or more of the first surfaces or with one or more of the second surfaces of the plurality of second structures, or ii) from about 1% to about 99%, from about 2% to about 95%, from about 5% to about 90%, or even from about 10% to about 50% of the plurality of first structures have second surfaces that each overlap through the thickness of the deformable membrane with one or more of the first surfaces or with one or more of the second surfaces of the plurality of second structures. In some embodiments the second layer may include a third electrode. The third electrode may be embedded within the second layer or proximate to or in contact with at least one of the first and the second major surfaces of the second layer and the third electrode overlaps with the at least one first electrode and the at least one second electrode through the thickness of the force-sensing capacitor element. In some embodiments i) from about 1% to about 99%, from about 2% to about 95%, from about 5% to about 90%, or even from about 10% to about 50% of the plurality of first structures have first surfaces that each overlap through the thickness of the deformable membrane with one or more of the first surfaces or with one or more of the second surfaces of the plurality of second structures, or ii) from about 1% to about 99%, from about 2% to about 95%, from about 5% to about 90%, or even from about 10% to about 50% of the plurality of first structures have second surfaces that each overlap through the thickness of the deformable membrane with one or more of the first surfaces or with one or more of the second surfaces of the plurality of second structures. In some embodiments the second layer may include a third electrode. The third electrode may be embedded within the second layer or proximate to or in contact with at least one of the first and the second major surfaces of the second layer and the third electrode overlaps with the at least one first electrode and the at least one second electrode through the thickness of the force-sensing capacitor element.

The first arrangement of the plurality of first structures and the second arrangement of the plurality of second structures may be formed by any known techniques in the art, including but not limited to, molding, micro-replication processes, embossing, scribing, ablation, or printing (e.g., ink jet printing, screen printing, stencil printing) and the like. Combinations of processes may be used. The bonding of various layers and structures surfaces can be performed by known techniques in the art, including but not limited, adhesive bonding (including using cure in place adhesive, hot melt adhesive or pressure sensitive adhesive and corresponding lamination techniques), fusing and the like. Combinations of bonding process may be used. In some embodiments, the first structures and/or second structures may be integrally formed during the fabrication of the first layer, second layer and third layer.

In any of the embodiments of the deformable membranes, force-sensing capacitor elements and methods of making thereof of the present disclosure, if the first layer includes at least one first electrode proximate to or in contact with one of the first major surface and the second major surface of the first layer, the exterior surface of the at least one first electrode inherently becomes part of the corresponding first major surface or second major surface of the first layer. In any of the embodiments of the deformable membranes, force-sensing capacitor elements and methods of making thereof of the present disclosure, if the first layer includes at least one first electrode and at least one second electrode forming at least one electrode pair proximate to or in contact with at least one of the first and the second major surfaces of the first layer, the exterior surfaces of the at least one first electrode and at least one second electrode inherently become part of the corresponding first major surface or second major surface of the first layer.

In any of the embodiments of the deformable membranes, force-sensing capacitor elements and methods of making thereof of the present disclosure, if the second layer includes at least one second electrode proximate to or in contact with one of the first major surface and the second major surface of the second layer, the exterior surface of the at least one second electrode inherently becomes part of the corresponding first major surface, or second major surface of the second layer. In any of the embodiments of the deformable membranes, force-sensing capacitor elements and methods of making thereof of the present disclosure, if the second layer includes at least one first electrode and at least one second electrode forming at least one electrode pair proximate to or in contact with at least one of the first and the second major surfaces of the second layer, the exterior surfaces of the at least one first electrode and at least one second electrode inherently become part of the corresponding first major surface or second major surface of the second layer.

In any of the embodiments of the deformable membranes, force-sensing capacitor elements and methods of making thereof of the present disclosure, the first surfaces and second surfaces of the plurality of first structures of the first arrangement may be opposite each other, i.e. opposite first and second surfaces. In any of the embodiments of the deformable membranes, force-sensing capacitor elements and methods of making thereof of the present disclosure, the first surfaces and second surfaces of the plurality of second structures of the second arrangement may be opposite each other, i.e. opposite first and second surfaces.

Select embodiments of the present disclosure include, but are not limited to, the following:

In a first embodiment, the present disclosure provides a deformable membrane comprising:
 a first layer having first and second major surfaces,
 a second layer having first and second major surfaces,
 a third layer having first and second major surfaces interposed between the second major surface of the first layer and the second major surface of the second layer, a first arrangement comprising a plurality of first structures, with corresponding first void regions, interposed between the second major surface of the first layer and the first major surface of the third layer, wherein each first structure has a first surface facing the second major surface of the first layer and a second surface facing the first major surface of the third layer, and a second arrangement comprising a plurality of second structures, with corresponding second void regions, interposed between the second major surface of the second layer and the second major surface of the third layer, wherein each second structure has a first surface facing the second major surface of the second layer and a second surface facing the second major surface of the third layer; and wherein
  i) from about 1% to about 99% of the plurality of first structures have first surfaces that each overlap through the thickness of the deformable membrane with one or more of the first surfaces or with one or more of the second surfaces of the plurality of second structures, or
  ii) from about 1% to about 99% of the plurality of first structures have second surfaces that each overlap through the thickness of the deformable membrane with one or more of the first surfaces or with one or more of the second surfaces of the plurality of second structures.

In a second embodiment, the present disclosure provides a deformable membrane according to the first embodiment, wherein at least one of the first and second fill factors of the first structures is between about 1 percent and about 60 percent and at least one of the first and second fill factors of the second structures is between about 1 percent and about 60 percent.

In a third embodiment, the present disclosure provides a deformable membrane according to the first or second embodiments, wherein the third layer comprises a material selected from the group of poly(ethyleneterephthalate), poly(ethylenenaphthalate), aramid polymer, polyether ether ketone, polyether sulfone, fluoropolymer, acrylic polymer, polyimide, glass, silicone, neoprene rubber, isoprene rubber, (ethylene propylene diene monomer) rubber, polyurethane, or epoxy.

In a fourth embodiment, the present disclosure provides a deformable membrane according to the first to third embodiments, wherein the first structures or the second structures comprise acrylic polymer, silicone, neoprene rubber, isoprene rubber, (ethylene propylene diene monomer) rubber, polyurethane, fluoropolymer, or epoxy.

In a fifth embodiment, the present disclosure provides a deformable membrane according to the first to fourth embodiments, wherein the third layer has a thickness of between about 5 micrometers and about 250 micrometers.

In a sixth embodiment, the present disclosure provides a deformable membrane according to the first to fifth embodiments, wherein the height of the first structures and the height of the second structures are between about 5 micrometers and about 1 millimeter.

In a seventh embodiment, the present disclosure provides a deformable membrane according to the first to sixth embodiments, wherein the average width of the plurality of first structures and the average width of the plurality of second structures are between about 5 micrometers and about 5 millimeters.

In an eighth embodiment, the present disclosure provides a deformable membrane according to the first to seventh embodiments, wherein the average width of the plurality of first structures is approximately equal to the average width of the plurality of second structures.

In a ninth embodiment, the present disclosure provides a deformable membrane according to the first to seventh embodiments, wherein the average width of the plurality of first structures is at least 25 percent larger than the average width of the plurality of second structures.

In a tenth embodiment, the present disclosure provides a deformable membrane according to the first to ninth embodiments, wherein average distance between nearest neighboring first structures and the average distance between nearest neighboring second structures are between approximately 20 micrometers and 20 millimeters.

In a eleventh embodiment, the present disclosure provides a deformable membrane according to the first to tenth embodiments, wherein the first structures of the first arrangement are arranged according to a first array comprising a series of repeating lattice of positions.

In a twelfth embodiment, the present disclosure provides a deformable membrane according to the eleventh embodiment, wherein the second structures of the second arrangement are arranged, according to a second array comprising a series of repeating lattice of positions.

In a thirteenth embodiment, the present disclosure provides a deformable membrane, according to the twelfth embodiment, wherein the first repeating lattice of positions and the second repeating lattice of positions differ by a non-zero bias angle.

In a fourteenth embodiment, the present disclosure provides a deformable membrane according to the thirteenth embodiment, wherein the bias angle is between about 10 degrees and 80 degrees.

In a fifteenth embodiment, the present disclosure provides a deformable membrane according to the first to tenth embodiments, wherein at least one of the first structures of the first arrangement and the second, structures of the second arrangement are arranged according to at least a partially random positional arrangement of structures In a sixteenth embodiment, the present disclosure provides a deformable membrane according to the first to fifteenth embodiments, wherein the volumetric shape of the first structures and the volumetric shape of the second structures are selected from at least one of cylinders, elliptical pillars, pyramids, truncated pyramids, parallelepipeds, domes, truncated domes, spheres, truncated spheres, ellipsoids, truncated ellipsoids, prisms, and wedges.

In a seventeenth embodiment, the present disclosure provides a force-sensing capacitor element comprising:
  a deformable membrane according to any one of the first to sixteenth embodiments;
  at least one first electrode embedded within the first layer or proximate to or in contact with one of the first major surface and the second major surface of the first layer; and
  at least one second electrode embedded within the second layer or proximate to or in contact with one of the first major surface and the second major surface of the second layer.

In an eighteenth embodiment, the present disclosure provides a force-sensing capacitor element according to the seventeenth embodiment, wherein the at least one first electrode includes a plurality of first electrodes.

In a nineteenth embodiment, the present disclosure provides a force-sensing capacitor element according to the seventeenth or eighteenth embodiments, wherein the at least one second electrode includes a plurality of second electrodes.

In a twentieth embodiment, the present disclosure provides a force-sensing capacitor element comprising:
  a deformable membrane according to any one of the first to sixteenth embodiments; and at least one first electrode and at least one second electrode forming at least one electrode pair embedded within the first layer or proximate to or in contact with at least one of the first and the second major surfaces of the first layer, wherein each of the at least one first electrode and the at least one second electrode are separated by a gap.

In a twenty-first embodiment, the present disclosure provides a force-sensing capacitor element according to the twentieth embodiment, further comprising a third electrode.

In a twenty-second embodiment, the present disclosure provides a force-sensing capacitor element according to the twenty-first embodiment, wherein the third electrode is embedded within the second layer or proximate to or in contact with at least one of the first and the second major surfaces of the second layer and the third electrode overlaps with the at least one first electrode and the at least one second electrode through the thickness of the force-sensing capacitor element.

In a twenty-third embodiment, the present disclosure provides a force-sensing capacitor element according to the seventeenth to twenty-second embodiments, further comprising capacitance measurement circuitry, wherein the at least one first electrode and the at least one second electrode are connected to capacitance measurement circuitry and the capacitance measurement circuitry is configured to measure the capacitance between the at least one first electrode and the at least one second electrode.

In a twenty-fourth embodiment, the present disclosure provides a force-sensing capacitor element according to the twenty-second embodiment, further comprising capacitance measurement circuitry, wherein the at least one first electrode, the at least one second electrode, and the third electrode are connected to the capacitance measurement circuitry and the capacitance measurement circuitry is configured to measure the capacitance between the at least one first electrode and the third electrode and the capacitance between the at least one second electrode and the third electrode.

In a twenty-fifth embodiment, the present disclosure provides a force-sensing capacitor element according to the twentieth to twenty-fourth embodiments, wherein the at least one first electrode includes a plurality of first electrodes.

In a twenty-sixth embodiment, the present disclosure provides a force-sensing capacitor element according to the twentieth to twenty-fifth embodiments, wherein the at least one second electrode includes a plurality of second electrodes.

In a twenty-seventh embodiment, the present disclosure provides an electronic device comprising a three-sensing capacitor element of any one of the seventeenth to twenty-sixth embodiments.

In a twenty-eighth embodiment, the present disclosure provides a touch screen display comprising a force-sensing capacitor element of any one of claims the seventeenth to twenty-sixth embodiments.

EXAMPLES

A number of embodiments of deformable membranes are modeled, with the array used for the first arrangement of first structures and the second arrangement of second structures and the spatial configuration of the two arrangements are as follows. The first arrangement of first structures and the second arrangement of second structures are both defined as a square grid array of structures, each having the same pitch, i.e. distance between centroids of nearest neighboring features, of 300 micrometers. The two arrays are aligned so that they overlap, i.e. every first structure of the first arrangement aligns through the thickness of the deformable membrane with a second structure of the second arrangement. The position of the axis of rotation within the array of second structures is selected randomly to be at the center of one square of a randomly selected square grid array. The second arrangement of second structures is then biased, i.e. rotated, 45 degrees relative to the first arrangement of first structures to obtain the desired spatial configuration. Variation in the size of the first structures is then used to vary the fill factor and the proportion of first structures that overlap with at least one second structure was determined by inspection.

The first arrangement of first structures and the second arrangement of second structures are both defined as a square grid array of cylindrical structures, each having the same pitch, i.e. distance between centroids of nearest neighboring features, of 300 micrometers. By selecting cylinders as the shape of the first and second structures, the first and second surfaces of all the first and second structures are all circular in shape. By varying the diameter of the cylinders of the first structures and second structures the fill factors are changed. By changing the fill factor of one or both of the first arrangement of first structures and the second arrangement of second structures, the fraction of the number of first structures that have first surfaces or second surfaces that overlap through the thickness the deformable membrane with one or more the first surfaces or one or more of the second surfaces of the second structures is calculated. In this model, as both the first structures and second structures are cylinders, the results do not vary with respect to which first and second surfaces of the first structures and which first and second surfaces of the second structure are selected for the calculation of the overlap of structures through the thickness of the deformable membrane. The variation in the diameter of the cylinder of the first structures, the fill factor of the first structures, the diameter of the cylinder of the second structures, the fill factor of the second structure and the calculation of the proportion of first structures that overlap with at least one second structure are shown in Table 1. Embodiments 2, 7 and 11 correspond to the deformable membranes depicted in FIGS. 3A, 3B and 3C, respectively.

TABLE 1

| Embodiment | First Structures Diameter (micrometers) | First Structures Fill Factor | Second Structures Diameter (micrometers) | Second Structures Fill Factor | Proportion of First Structures that Overlap with at Least One Second Structure |
|---|---|---|---|---|---|
| 1 | 50 | 2.2% | 50 | 2.2% | 8% |
| 2 | 50 | 2.2% | 100 | 8.7% | 22% |
| 3 | 50 | 2.2% | 150 | 19.6% | 33% |

TABLE 1-continued

| Embodiment | First Structures Diameter (micrometers) | First Structures Fill Factor | Second Structures Diameter (micrometers) | Second Structures Fill Factor | Proportion of First Structures that Overlap with at Least One Second Structure |
|---|---|---|---|---|---|
| 4 | 50 | 2.2% | 200 | 34.9% | 60% |
| 5 | 50 | 2.2% | 250 | 54.5% | 75% |
| 6 | 100 | 8.7% | 100 | 8.7% | 33% |
| 7 | 100 | 8.7% | 150 | 19.6% | 57% |
| 8 | 100 | 8.7% | 200 | 34.9% | 78% |
| 9 | 100 | 8.7% | 250 | 54.5% | 93% |
| 10 | 150 | 19.6% | 150 | 19.6% | 77% |
| 11 | 150 | 19.6% | 200 | 34.9% | 95% |
| 12 | 150 | 19.6% | 250 | 54.5% | 100% |
| 13 | 200 | 34.9% | 200 | 34.9% | 100% |
| 14 | 200 | 34.9% | 250 | 54.5% | 100% |
| 15 | 250 | 54.5% | 250 | 54.5% | 100% |

Table 1 lists details for each of the plurality of first structures and plurality of second structures, their arrangements, and the relationship between the overlap of their arrangements. First and second structures can be applied to each side of a third layer, which may be a planar substrate (also referred to herein as a central web) such as, for example, PET, PEN, or polyimide. The width of the structures, e.g. diameter, may be, for example, at least about 25 micrometers, at least about 50 micrometers, at least about 75 micrometers, at least about 100 micrometers or even at least about 125 micrometers. The first and second structures may be formed, for example, of a rubber material (e.g., silicone, EPDM, isoprene, neoprene). The first and second structures may have a height of, for example, at least 25 micrometers, at least 50 micrometers, at least 75 micrometers, at least 100 micrometers, at least 125 micrometers, or even at least 150 micrometers. The structures may be applied to the central web by molding, embossing, scribing, ablation, or printing (e.g., ink jet printing, screen printing, stencil printing). The central web and first and second structures formed thereon may be bonded to first layer and second layer, which may both be planar substrates, according to FIGS. 1 and 2. Electrodes may be applied to the various layer of the deformable membrane, as described herein.

What is claimed is:

1. A deformable membrane comprising:
   a first layer having first and second major surfaces;
   a second layer having first and second major surfaces;
   a third layer having first and second major surfaces interposed between the second major surface of the first layer and the second major surface of the second layer;
   a first arrangement comprising a plurality of first structures, with corresponding first void regions, interposed between the second major surface of the first layer and the first major surface of the third layer, wherein each first structure has a first surface facing the second major surface of the first layer and a second surface facing the first major surface of the third layer; and
   a second arrangement comprising a plurality of second structures, with corresponding second void regions, interposed between the second major surface of the second layer and the second major surface of the third layer, wherein each second structure has a first surface facing the second major surface of the second layer and a second surface facing the second major surface of the third layer; and wherein i) from about 1% to about 99% of the plurality of first structures have first surfaces that each overlap through the thickness of the deformable membrane with one or more of the first surfaces or with one or more of the second surfaces of the plurality of second structures, or
   ii) from about 1% to about 99% of the plurality of first structures have second surfaces that each overlap through the thickness of the deformable membrane with one or more of the first surfaces or with one or more of the second surfaces of the plurality of second structures,
   wherein the first structures of the first arrangement are arranged according to a first array comprising a series of repeating lattice of positions,
   wherein the second structures of the second arrangement are arranged according to a second array comprising a series of repeating lattice of positions, and
   wherein the first repeating lattice of positions and the second repeating lattice of positions differ by a non-zero bias angle.

2. A deformable membrane according to claim 1, wherein at least one of the first and second fill factors of the first structures is between about 1 percent and about 60 percent and at least one of the first and second fill factors of the second structures is between about 1 percent and about 60 percent.

3. A deformable membrane according to claim 1, wherein the third layer comprises a material selected from the group of poly(ethyleneterephthalate), poly(ethylenenaphthalate), aramid polymer, polyether ether ketone, polyether sulfone, fluoropolymer, acrylic polymer, polyimide, glass, silicone, neoprene rubber, isoprene rubber, (ethylene propylene diene monomer) rubber, polyurethane, or epoxy.

4. A deformable membrane according to claim 1, wherein the first structures or the second structures comprise acrylic polymer, silicone, neoprene rubber, isoprene rubber, (ethylene propylene diene monomer) rubber, polyurethane, fluoropolymer, or epoxy.

5. A deformable membrane according to claim 1, wherein the third layer has a thickness of between about 5 micrometers and about 250 micrometers.

6. A deformable membrane according to claim 1, wherein the height of the first structures and the height of the second structures are between about 5 micrometers and about 1 millimeter.

7. A deformable membrane according to claim 1, wherein the average width of the plurality of first structures and the average width of the plurality of second structures are between about 5 micrometers and about 5 millimeters.

8. A deformable membrane according to claim 1, wherein the average width of the plurality of first structures is approximately equal to the average width of the plurality of second structures.

9. A deformable membrane according to claim 1, wherein the average width of the plurality of first structures is at least 25 percent larger than the average width of the plurality of second structures.

10. A deformable membrane according to claim 1, wherein average distance between nearest neighboring first structures and the average distance between nearest neighboring second structures are between approximately 20 micrometers and 20 millimeters.

11. A deformable membrane according to claim 1, wherein the bias angle is between about 10 degrees and 80 degrees.

12. A deformable membrane according to claim 1, wherein the volumetric shape of the first structures and the volumetric shape of the second structures are selected from at least one of cylinders, elliptical pillars, pyramids, truncated pyramids, parallelepipeds, domes, truncated domes, spheres, truncated spheres, ellipsoids, truncated ellipsoids, prisms, and wedges.

13. A force-sensing capacitor element comprising:
a deformable membrane according to claim 1;
at least one first electrode embedded within the first layer or proximate to or in contact with one of the first major surface and the second major surface of the first layer; and
at least one second electrode embedded within the second layer or proximate to or in contact with one of the first major surface and the second major surface of the second layer.

14. A force-sensing capacitor according to claim 13, wherein the at least one first electrode includes a plurality of first electrodes.

15. A force-sensing capacitor according to claim 13, wherein the at least one second electrode includes a plurality of second electrodes.

16. A force-sensing capacitor element comprising:
a deformable membrane according to claim 1; and
at least one first electrode and at least one second electrode forming at least one electrode pair embedded within the first layer or proximate to or in contact with at least one of the first and the second major surfaces of the first layer, wherein each of the at least one first electrode and the at least one second electrode are separated by a gap.

17. A deformable membrane comprising:
a first layer having first and second major surfaces;
a second layer having first and second major surfaces;
a third layer having first and second major surfaces interposed between the second major surface of the first layer and the second major surface of the second layer;
a first arrangement comprising a plurality of first structures, with corresponding first void regions, interposed between the second major surface of the first layer and the first major surface of the third layer, wherein each first structure has a first surface facing the second major surface of the first layer and a second surface facing the first major surface of the third layer; and
a second arrangement comprising a plurality of second structures, with corresponding second void regions, interposed between the second major surface of the second layer and the second major surface of the third layer, wherein each second structure has a first surface facing the second major surface of the second layer and a second surface facing the second major surface of the third layer; and wherein
i) from about 1% to about 99% of the plurality of first structures have first surfaces that each overlap through the thickness of the deformable membrane with one or more of the first surfaces or with one or more of the second surfaces of the plurality of second structures, or
ii) from about 1% to about 99% of the plurality of first structures have second surfaces that each overlap through the thickness of the deformable membrane with one or more of the first surfaces or with one or more of the second surfaces of the plurality of second structures,
wherein at least one of the first structures of the first arrangement and the second structures of the second arrangement are arranged according to at least a partially random positional arrangement of structures.

* * * * *